United States Patent
Yang et al.

(10) Patent No.: US 12,101,774 B2
(45) Date of Patent: Sep. 24, 2024

(54) METHOD AND APPARATUS FOR TRANSMITTING AND RECEIVING SIGNALS IN WIRELESS COMMUNICATION SYSTEM

(71) Applicant: LG ELECTRONICS INC., Seoul (KR)

(72) Inventors: Suckchel Yang, Seoul (KR); Sukhyon Yoon, Seoul (KR); Seonwook Kim, Seoul (KR); Changhwan Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 492 days.

(21) Appl. No.: 17/310,314

(22) PCT Filed: Feb. 17, 2020

(86) PCT No.: PCT/KR2020/002268
§ 371 (c)(1),
(2) Date: Jul. 27, 2021

(87) PCT Pub. No.: WO2020/167105
PCT Pub. Date: Aug. 20, 2020

(65) Prior Publication Data
US 2022/0104240 A1    Mar. 31, 2022

(30) Foreign Application Priority Data
Feb. 15, 2019    (KR) .................... 10-2019-0018268

(51) Int. Cl.
*H04W 72/21* (2023.01)
*H04W 74/08* (2009.01)

(52) U.S. Cl.
CPC .......... *H04W 72/21* (2023.01); *H04W 74/08* (2013.01)

(58) Field of Classification Search
None
See application file for complete search history.

(56) References Cited

U.S. PATENT DOCUMENTS

2017/0325215 A1    11/2017    Takeda et al.
2019/0230683 A1*   7/2019    Akkarakaran .... H04W 72/1268
(Continued)

OTHER PUBLICATIONS

PCT International Application No. PCT/KR2020/002268, International Search Report dated Jun. 3, 2020, 15 pages.
(Continued)

*Primary Examiner* — Saumit Shah
(74) *Attorney, Agent, or Firm* — LEE, HONG, DEGERMAN, KANG & WAIMEY

(57) ABSTRACT

A method and an apparatus for transmitting and receiving signals in a wireless communication system, according to an embodiment of the present disclosure, receive downlink control information (DCI) for uplink data transmission, perform Listen-Before-Talk (LBT) on a sub-band where a physical uplink shared channel (PUSCH) resource is located, and transmit the uplink data on the PUSCH resource on the basis of the LBT. Further, Uplink control information (UCI) for candidate physical uplink control channel (PUCCH) resources may be piggybacked on the PUSCH resource on the basis of the PUSCH resource overlapping with one or more candidate PUCCH resources from among the candidate PUCCH resources, and on the basis of a processing time, for a first candidate PUCCH resource that is the most preceding in a time domain among the candidate PUCCH resources, being equal to or greater than the minimum processing time of the terminal.

12 Claims, 13 Drawing Sheets

(56) References Cited

U.S. PATENT DOCUMENTS

2020/0281012 A1\* 9/2020 Behravan .......... H04W 72/1268
2021/0288852 A1\* 9/2021 Jia ..................... H04L 27/26025

OTHER PUBLICATIONS

Samsung, "HARQ enhancements for NR-U," 3GPP TSG RAN WG1 Ad-Hoc Meeting 1901, R1-1901033, Jan. 2019, 10 pages.
Huawei et al., "Remaining issues on UCI multiplexing," 3GPP TSG RAN WG1 Meeting #92bis, R1-1803646, Apr. 2018, 6 pages.
Nokia et al., "On wideband operation in NR-U," 3GPP TSG RAN WG1 Meeting AH-1901, R1-1900349, Jan. 2019, 8 pages.
LG Electronics, "Remaining issues on UCI multiplexing," 3GPP TSG RAN WG1 Meeting #92bis, R1-1804556, Apr. 2018, 6 pages.

\* cited by examiner

[Fig. 1]
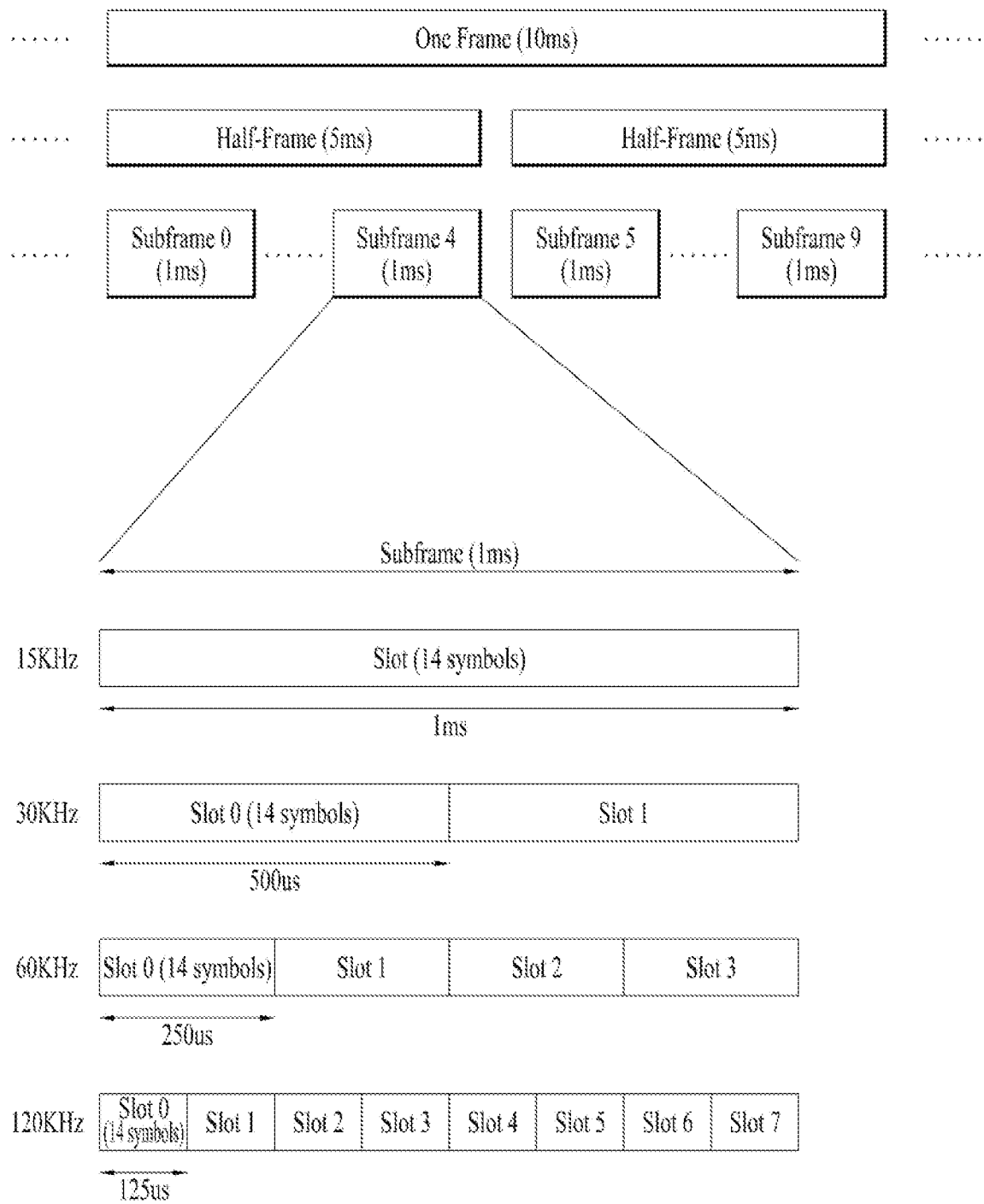

[Fig. 2]
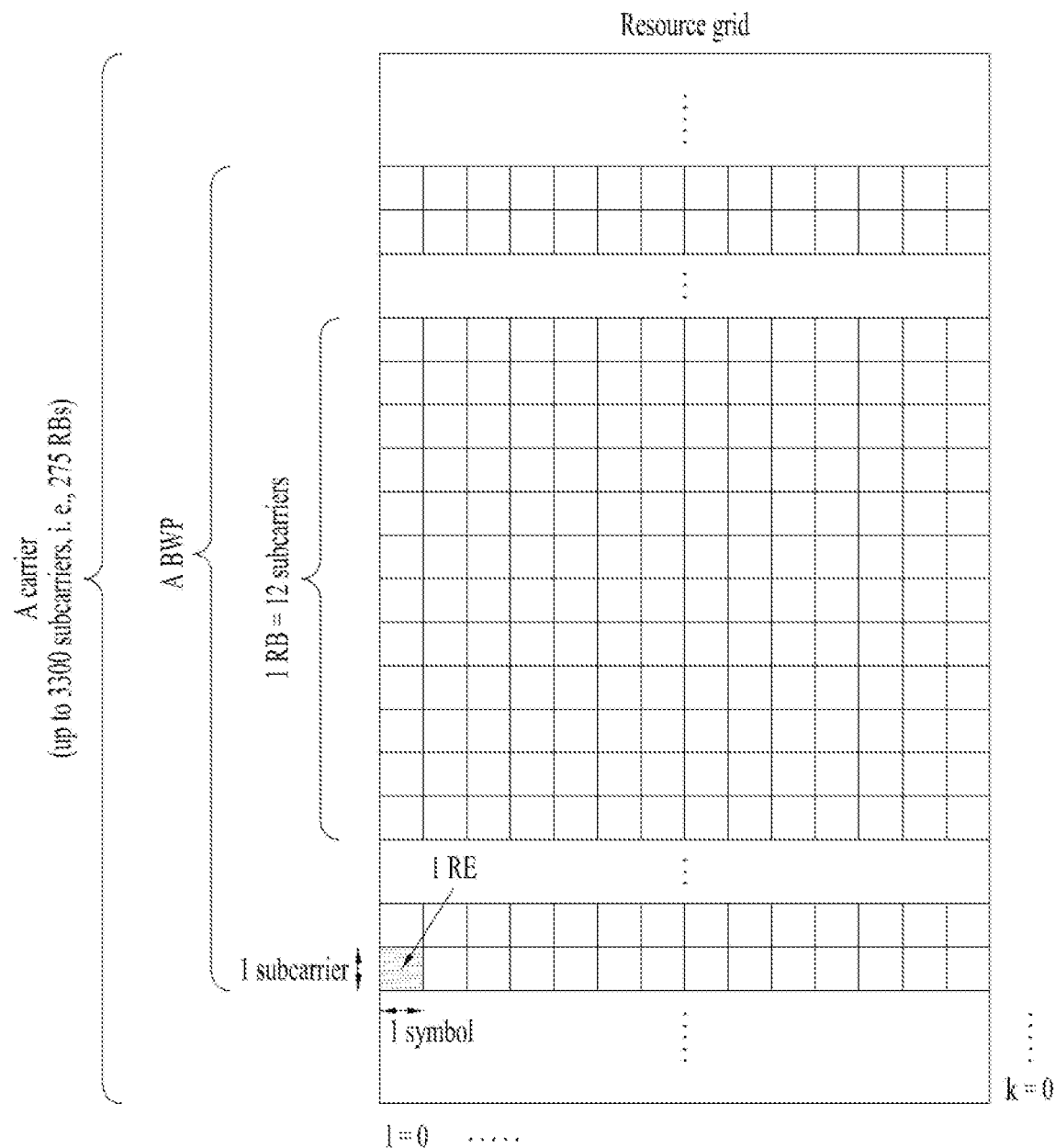

[Fig. 3]
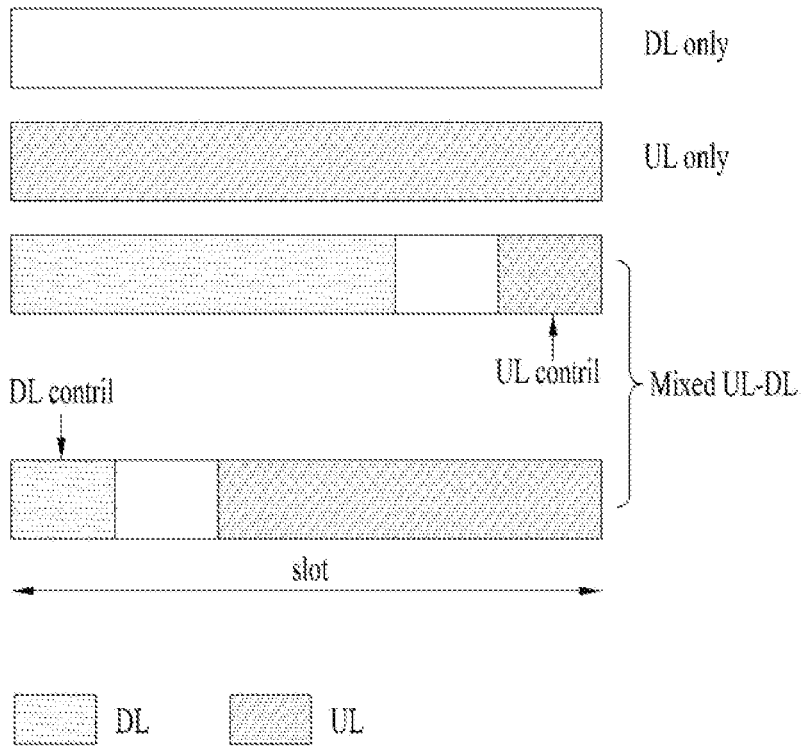
[Fig. 4]
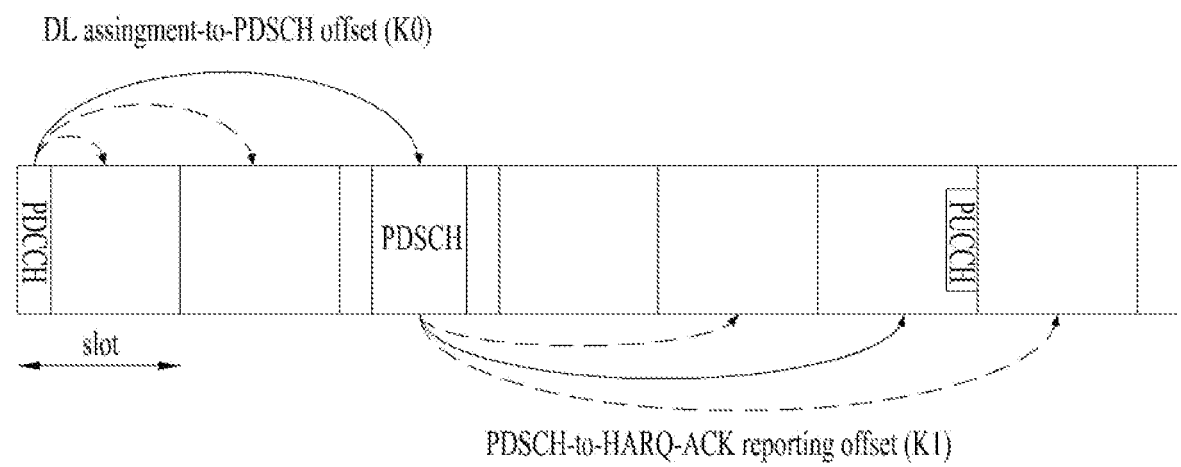

[Fig. 5]
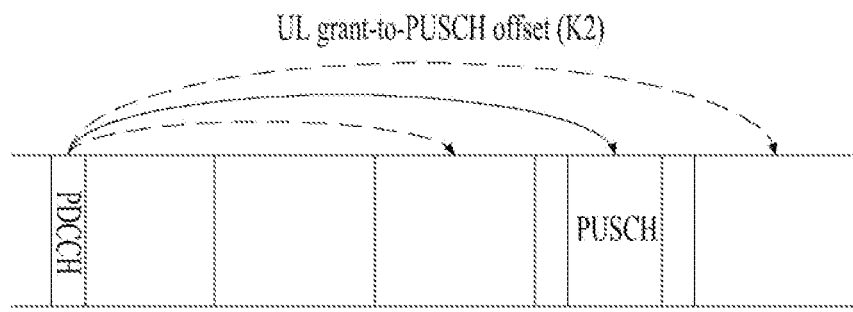
[Fig. 6]
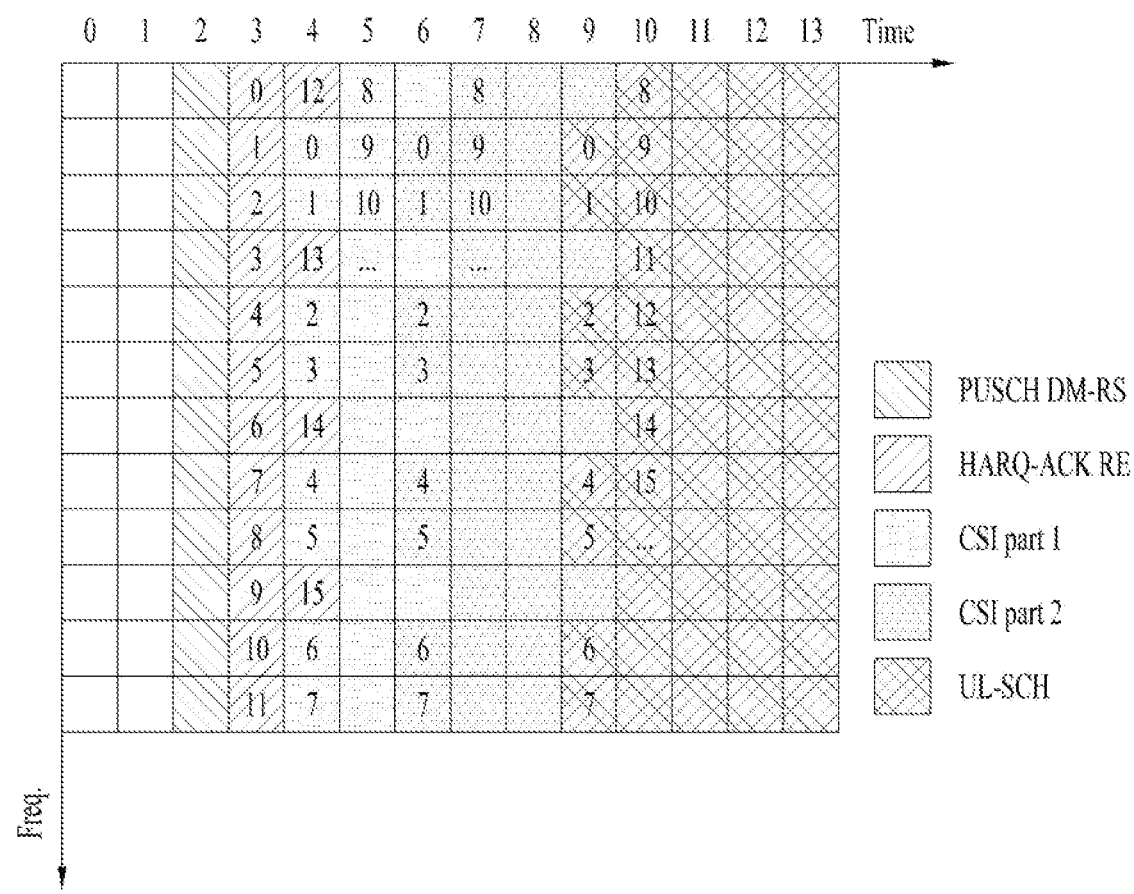

【Fig. 7】
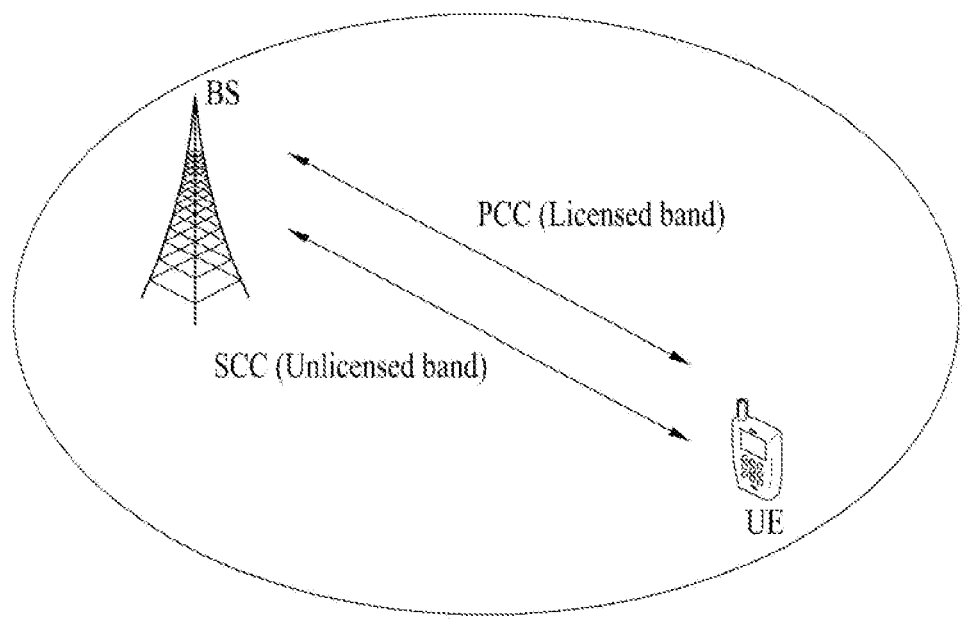
(a) Carrier aggregation between L-band and U-band
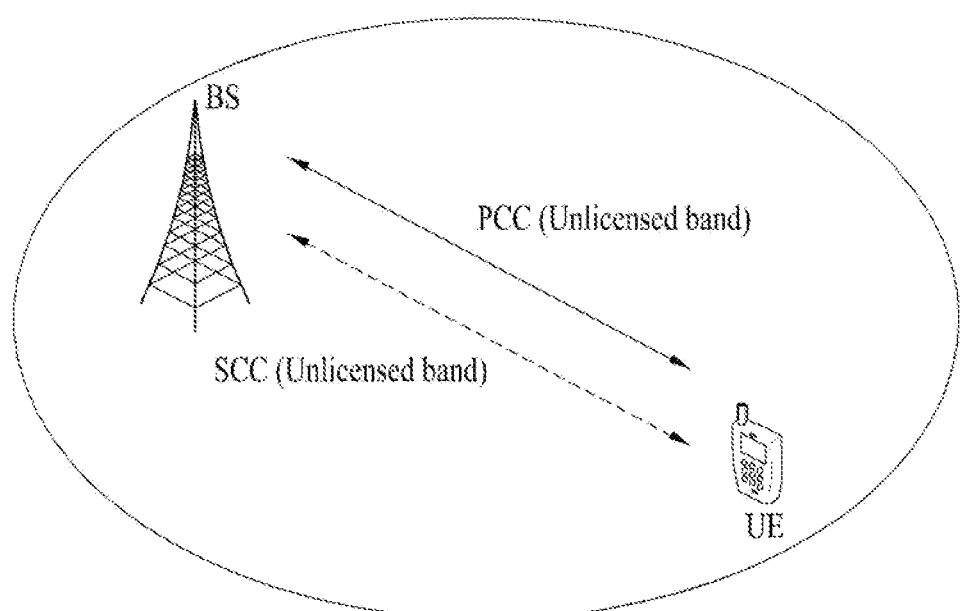
(b) Standalone U-band(s)

【Fig. 8】
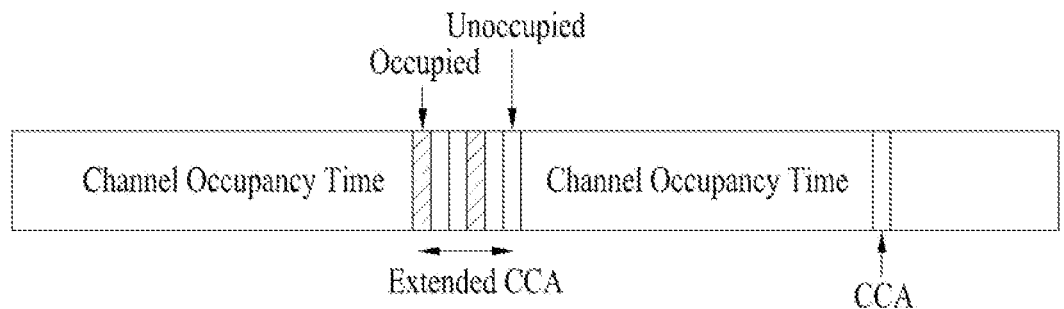
【Fig. 9】
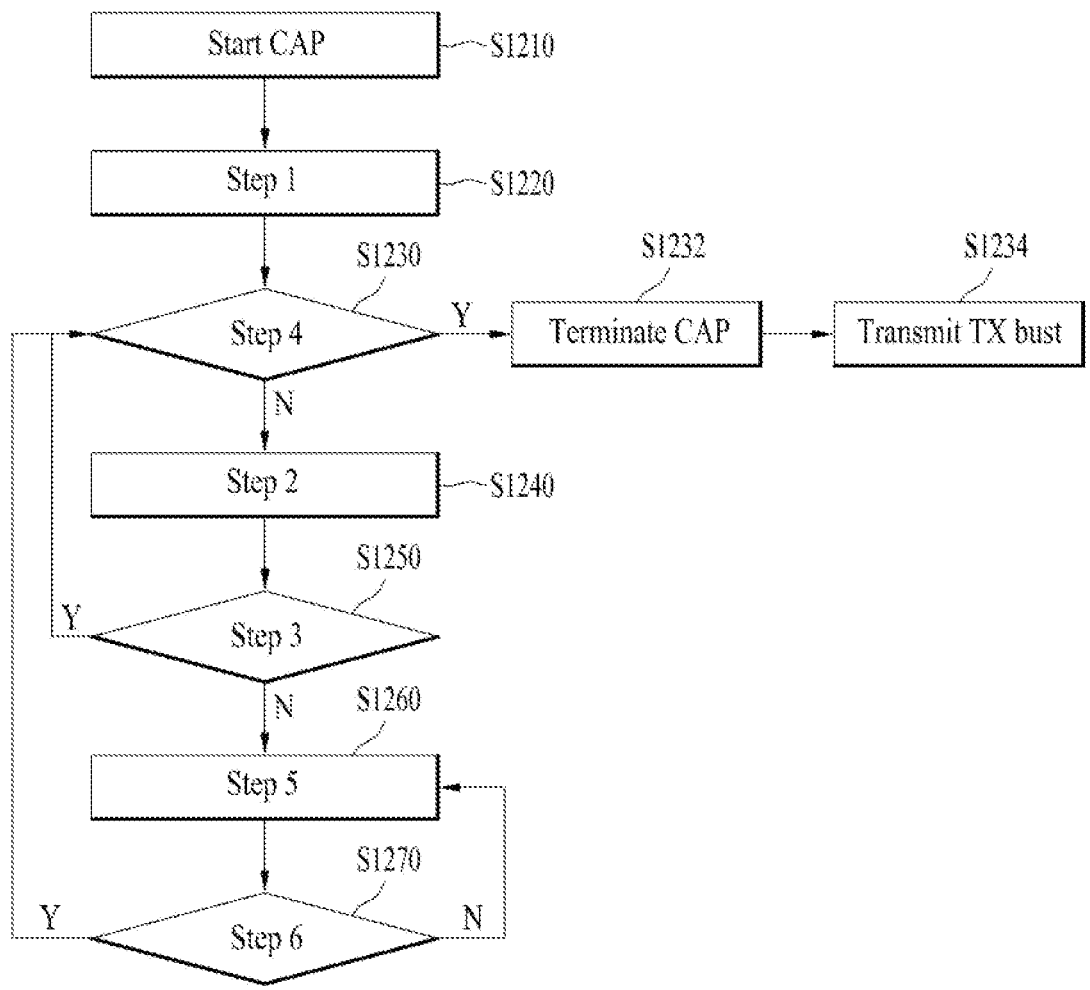

[Fig. 10]
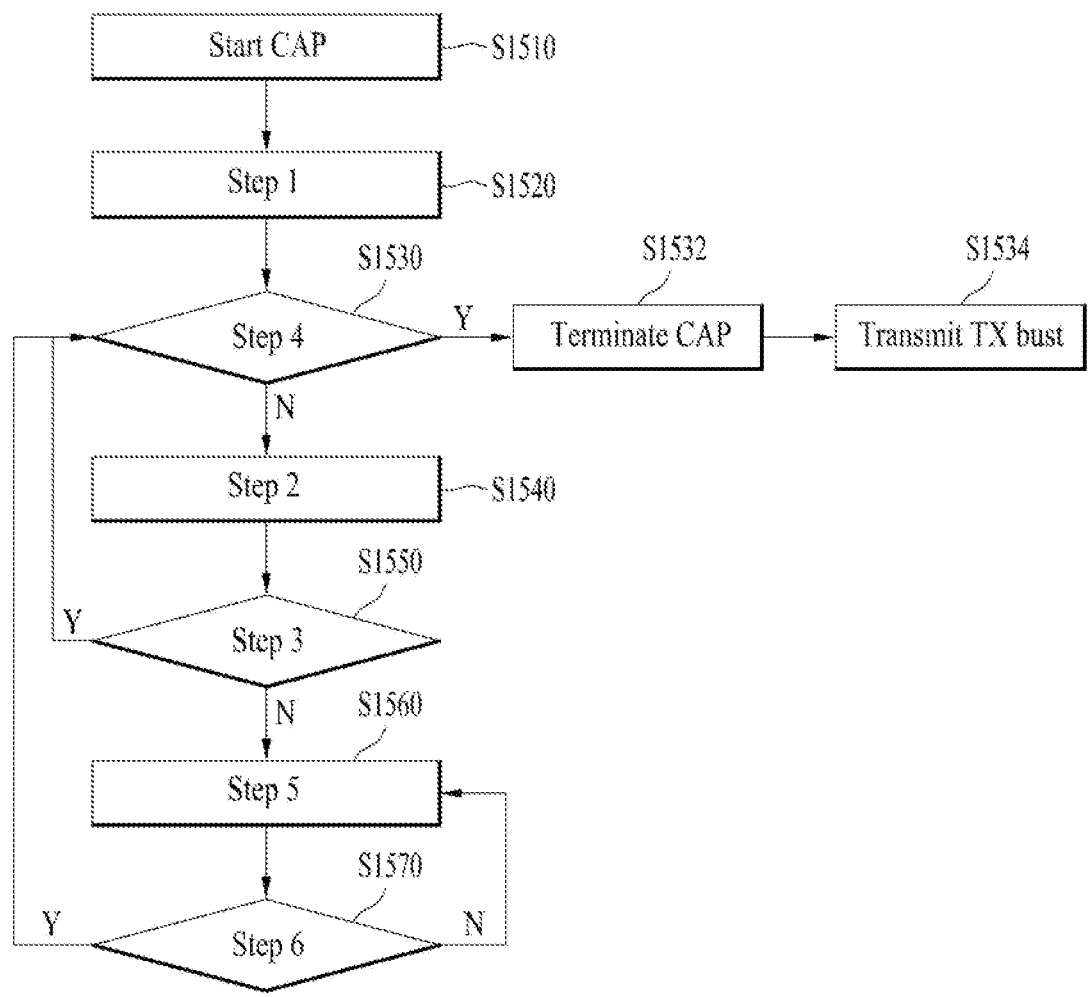

[Fig. 11]
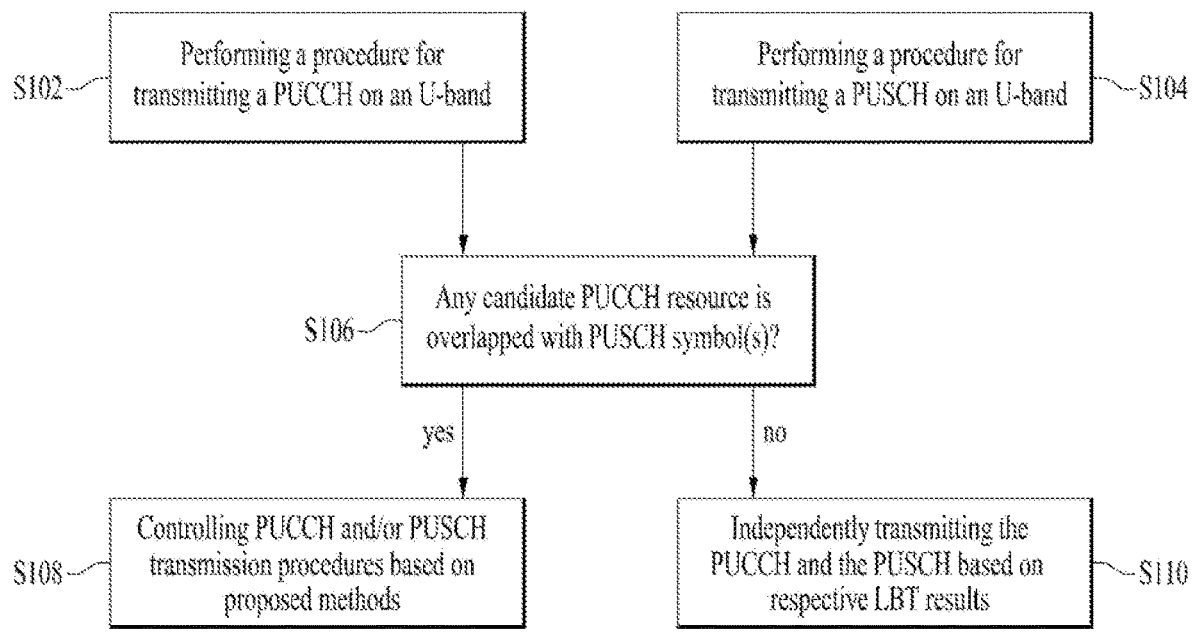

[Fig. 12]
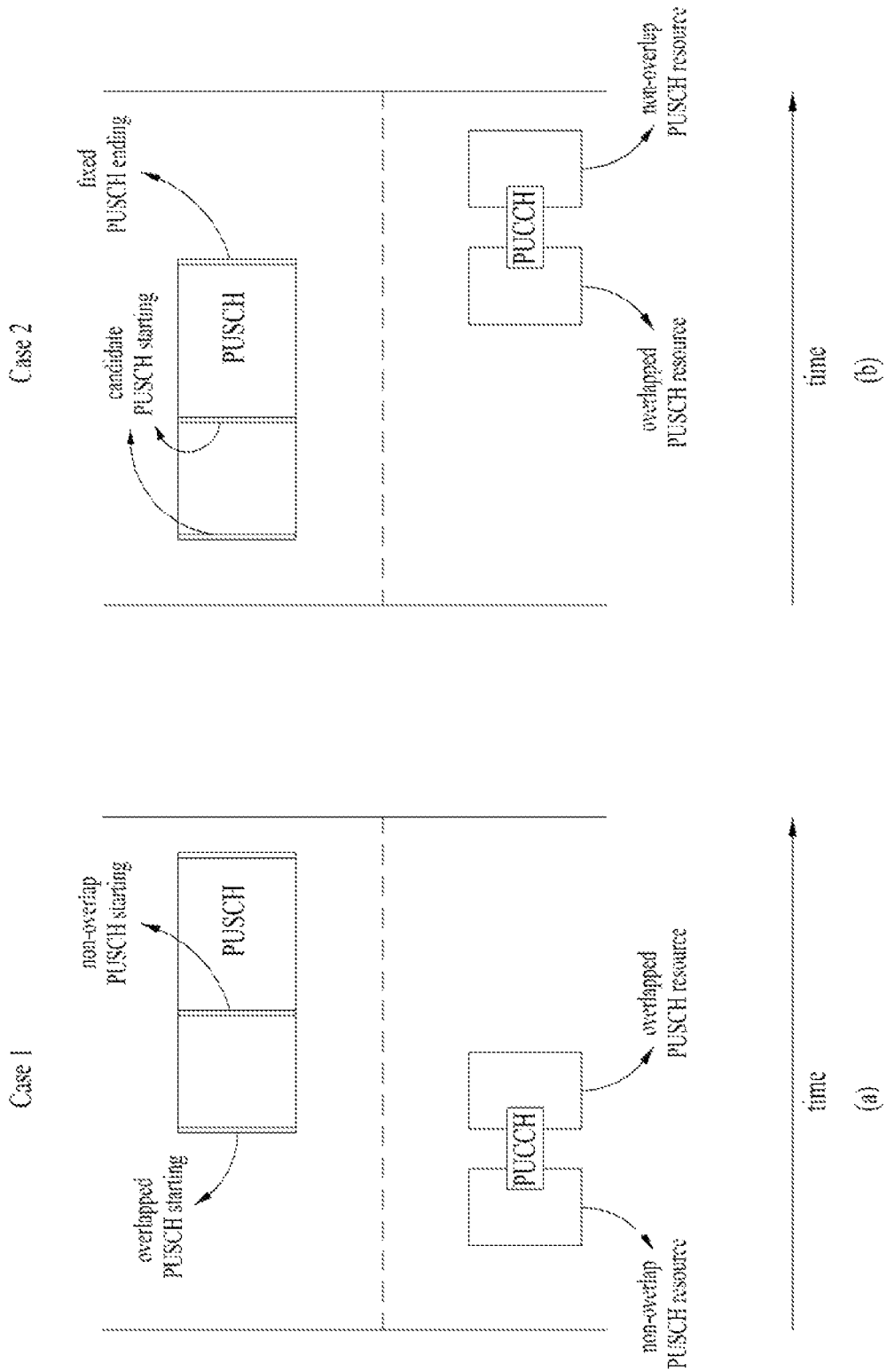

[Fig. 13]
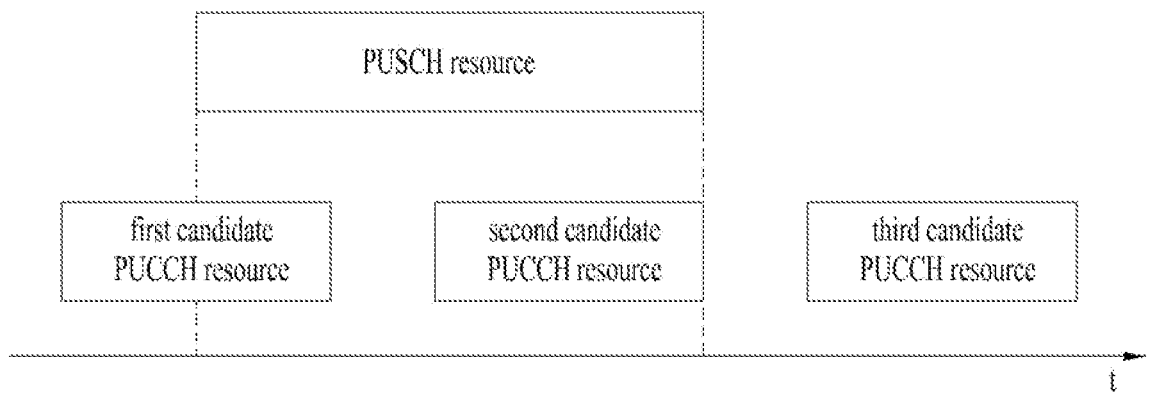
(a)
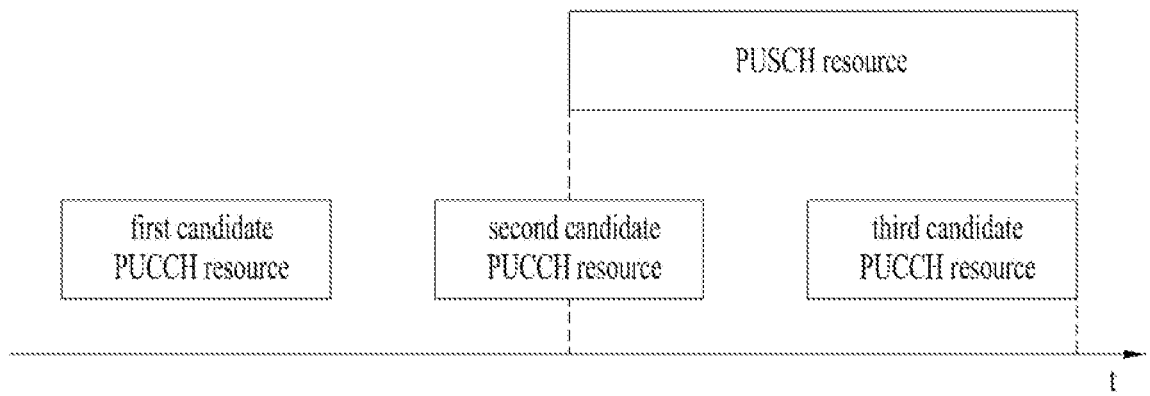
(b)

【Fig. 14】
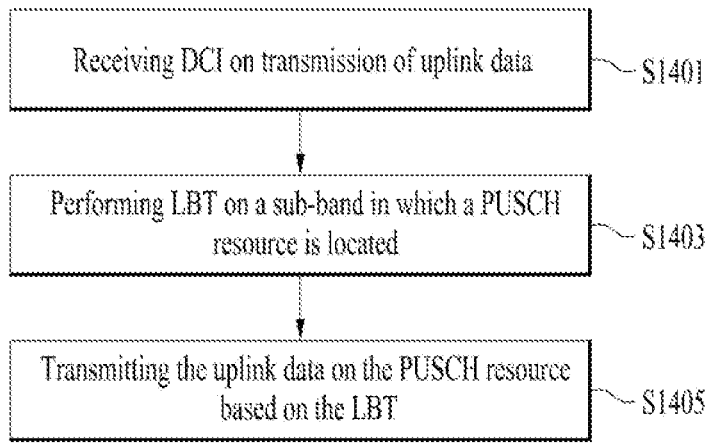
【Fig. 15】
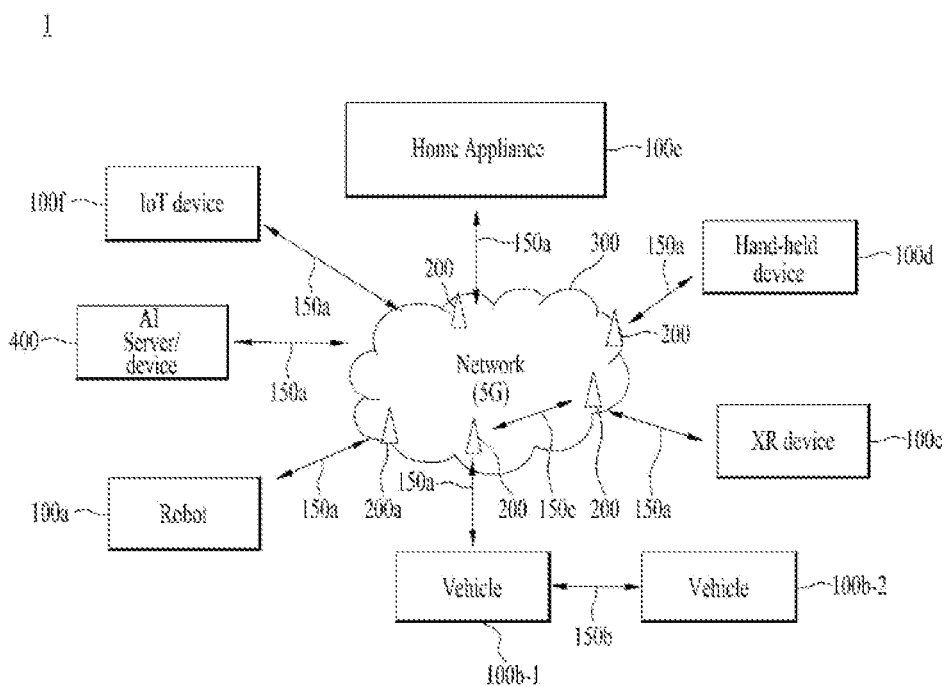

[Fig. 16]
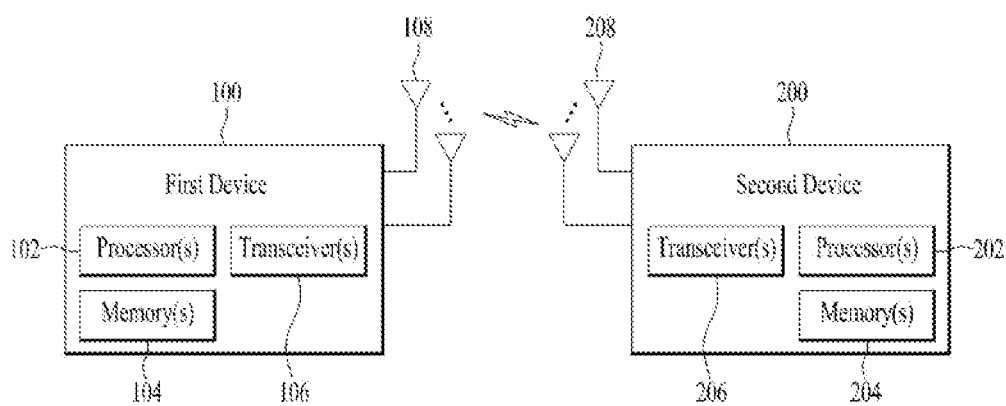
[Fig. 17]
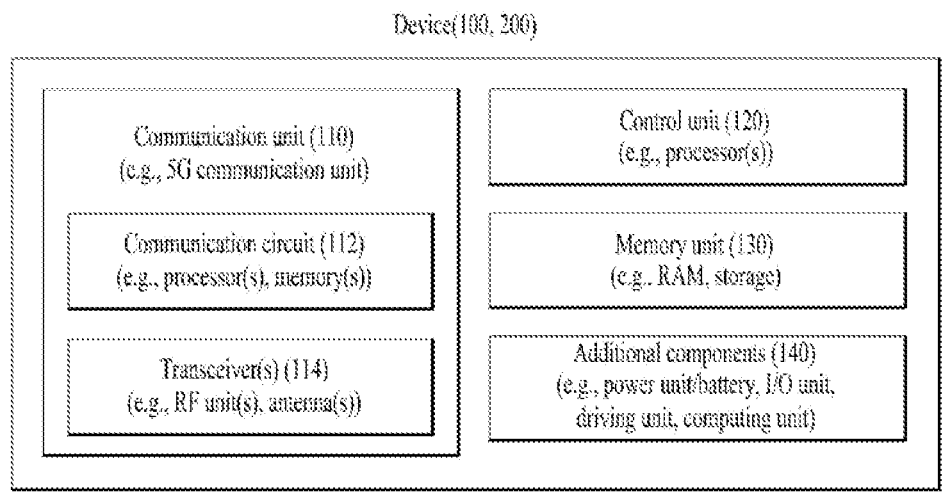

[Fig. 18]
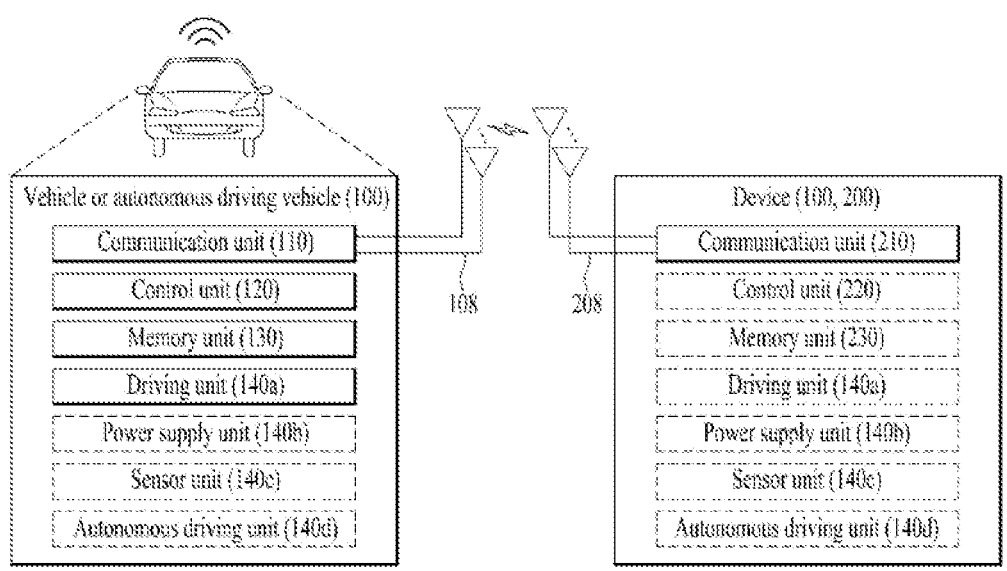

METHOD AND APPARATUS FOR TRANSMITTING AND RECEIVING SIGNALS IN WIRELESS COMMUNICATION SYSTEM

CROSS-REFERENCE TO RELATED APPLICATIONS

This application is the National Stage filing under 35 U.S.C. 371 of International Application No. PCT/KR2020/002268, filed on Feb. 17, 2020, which claims the benefit of earlier filing date and right of priority to Korean Patent Application No. 10-2019-0018268, filed on Feb. 15, 2019, the contents of which are all incorporated by reference herein in their entirety.

TECHNICAL FIELD

The present disclosure relates to a method and apparatus for use in a wireless communication system, and more particularly to a method and apparatus for transmitting and receiving signals in an unlicensed band.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of code division multiple access (CDMA) system, frequency division multiple access (FDMA) system, time division multiple access (TDMA) system, orthogonal frequency division multiple access (OFDMA) system, single carrier frequency division multiple access (SC-FDMA) system, and the like.

DISCLOSURE

Technical Problem

Provided are a method and apparatus for transmitting multiple uplink channels efficiently in a wireless communication system.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

The present disclosure provides a method and apparatus for receiving a signal in a wireless communication system.

In accordance with an aspect of the present disclosure, a method for enabling a communication apparatus to transmit and receive signals in an unlicensed band (U-band) in a wireless communication system may include receiving downlink control information (DCI) for uplink (UL) data transmission, performing a listen-before-talk (LBT) operation on a sub-band where physical uplink shared channel (PUSCH) resources are located, and transmitting the uplink (UL) data on the PUSCH resources based on the LBT operation. Based on not only one fact that the PUSCH resources overlap at least one candidate physical uplink control channel (PUCCH) resource from among a plurality of candidate PUCCH resources, but also another fact that a processing time of a first candidate PUCCH resource indicating the earliest resource in a time domain from among the candidate PUCCH resources is equal to or longer than a minimum processing time of the UE, uplink control information (UCI) for the candidate PUCCH resources may be piggybacked on the PUCCH resources.

In accordance with another aspect of the present disclosure, a communication apparatus configured to transmit and receive signals in a wireless communication system may include at least one transceiver, at least one processor, and at least one memory operatively connected to the at least one processor, and configured to store instructions such that the at least one processor performs specific operations by executing the instructions. The specific operations may include receiving downlink control information (DCI) for uplink (UL) data transmission, performing a listen-before-talk (LBT) operation on a sub-band where physical uplink shared channel (PUSCH) resources are located, and transmitting the uplink (UL) data on the PUSCH resources based on the LBT operation. Based on not only one fact that the PUSCH resources overlap at least one candidate physical uplink control channel (PUCCH) resource from among a plurality of candidate PUCCH resources, but also another fact that a processing time of a first candidate PUCCH resource indicating the earliest resource in a time domain from among the candidate PUCCH resources is equal to or longer than a minimum processing time of the UE, uplink control information (UCI) for the candidate PUCCH resources may be piggybacked on the PUCCH resources.

In accordance with another aspect of the present disclosure, a computer-readable storage medium may store instructions which when executed by at least one processor, cause the processor to perform specific operations. The specific operations may include receiving downlink control information (DCI) for uplink (UL) data transmission, performing a listen-before-talk (LBT) operation on a sub-band where physical uplink shared channel (PUSCH) resources are located, and transmitting the uplink (UL) data on the PUSCH resources based on the LBT operation. Based on not only one fact that the PUSCH resources overlap at least one candidate physical uplink control channel (PUCCH) resource from among a plurality of candidate PUCCH resources, but also another fact that a processing time of a first candidate PUCCH resource indicating the earliest resource in a time domain from among the candidate PUCCH resources is equal to or longer than a minimum processing time of the UE, uplink control information (UCI) for the candidate PUCCH resources may be piggybacked on the PUCCH resources.

In accordance with another aspect of the present disclosure, a device configured to operate for a user equipment (UE) may include at least one processor, and at least one memory operatively connected to the at least one processor, and configured to store instructions such that the at least one processor performs specific operations by executing the instructions. The specific operations may include receiving downlink control information (DCI) for uplink (UL) data transmission, performing a listen-before-talk (LBT) operation on a sub-band where physical uplink shared channel (PUSCH) resources are located, and transmitting the uplink (UL) data on the PUSCH resources based on the LBT operation. Based on not only one fact that the PUSCH resources overlap at least one candidate physical uplink control channel (PUCCH) resource from among a plurality of candidate PUCCH resources, but also another fact that a processing time of a first candidate PUCCH resource indicating the earliest resource in a time domain from among the candidate PUCCH resources is equal to or longer than a minimum processing time of the UE, uplink control information (UCI) for the candidate PUCCH resources may be piggybacked on the PUCCH resources.

In accordance with another aspect of the present disclosure, a method for enabling a base station (BS) to transmit and receive signals in a wireless communication system may include transmitting downlink control information (DCI) for uplink (UL) data transmission, and receiving the UL data on the PUSCH resources based on a listen-before-talk (LBT) operation on a sub-band where physical uplink shared channel (PUSCH) resources are located. Based on not only one fact that the PUSCH resources overlap at least one candidate physical uplink control channel (PUCCH) resource from among a plurality of candidate PUCCH resources, but also another fact that a processing time of a first candidate PUCCH resource indicating the earliest resource in a time domain from among the candidate PUCCH resources is equal to or longer than a minimum processing time of the UE, uplink control information (UCI) for the candidate PUCCH resources may be piggybacked on the PUCCH resources.

In accordance with another aspect of the present disclosure, a communication apparatus configured to transmit and receive signals in a wireless communication system may include at least one transceiver, at least one processor, and at least one memory operatively connected to the at least one processor, and configured to store instructions such that the at least one processor performs specific operations by executing the instructions. The specific operations may include transmitting downlink control information (DCI) for uplink (UL) data transmission, and receiving the UL data on the PUSCH resources based on a listen-before-talk (LBT) operation on a sub-band where physical uplink shared channel (PUSCH) resources are located. Based on not only one fact that the PUSCH resources overlap at least one candidate physical uplink control channel (PUCCH) resource from among a plurality of candidate PUCCH resources, but also another fact that a processing time of a first candidate PUCCH resource indicating the earliest resource in a time domain from among the candidate PUCCH resources is equal to or longer than a minimum processing time of the UE, uplink control information (UCI) for the candidate PUCCH resources may be piggybacked on the PUCCH resources.

In the methods and devices, the plurality of PUCCH resources may be separated from each other in the time domain. The at least one PUCCH resource may be a PUCCH resource that initially succeeds in the LBT operation, after the LBT operation has sequentially performed in the time domain for the plurality of PUCCH resources.

In the methods and devices, the first candidate PUCCH resource may be configured to overlap the PUSCH resources.

In the methods and devices, based on the fact that the PUSCH resources overlap at least one PUCCH resource from among the candidate PUCCH resources and another fact that the processing time of the first candidate PUCCH resource indicating the earliest resource in the time domain from among the candidate PUCCH resources is less than the minimum processing time of the UE, the UCI is not piggybacked on the PUSCH resources.

In the methods and devices, the PUSCH resources may include a plurality of candidate starting symbols. Based on the fact that the UCI is not piggybacked on the PUSCH resources, the UCI is transmitted through the remaining resources other than the at least one candidate PUCCH resource from among the candidate PUCCH resources, or the PUSCH is transmitted through the remaining resources other than at least one candidate starting symbol, that overlaps the at least one candidate PUCCH resource, from among the plurality of candidate starting symbols.

In the methods and devices, based on the fact that the candidate PUCCH resources and the PUSCH resources are located at the same sub-band, a listen-before-talk (LBT) operation for subsequent resources on the time domain from among the PUSCH resources and the candidate PUCCH resources may be omitted.

In the method or the device, the communication device may include an autonomous driving vehicle communicable with at least a user equipment (UE), a network, and another autonomous driving vehicle other than the communication device.

The above-described aspects of the present disclosure are only some of the preferred embodiments of the present disclosure, and various embodiments reflecting the technical features of the present disclosure may be derived and understood from the following detailed description of the present disclosure by those skilled in the art.

Advantageous Effects

According to an embodiment of the present disclosure, a communication device may perform transmission of multiple uplink channels more efficiently by an operation differentiated from a legacy operation.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

FIG. 1 is FIG. 1 illustrates a radio frame structure.

FIG. 2 illustrates a resource grid during the duration of a slot.

FIG. 3 illustrates a self-contained slot structure.

FIG. 4 illustrates an acknowledgment/negative acknowledgment (ACK/NACK) transmission process.

FIG. 5 illustrates a physical uplink shared channel (PUSCH) transmission process.

FIG. 6 illustrates exemplary multiplexing of control information in a PUSCH.

FIG. 7 illustrates a wireless communication system supporting an unlicensed band.

FIG. 8 illustrates an exemplary method of occupying resources in an unlicensed band.

FIGS. 9 and 10 are flowcharts illustrating channel access procedures (CAPs) for signal transmission in an unlicensed band.

FIGS. 11 to 14 are flowcharts illustrating uplink (UL) channel transmission according to the embodiments of the present disclosure.

FIGS. 15 to 18 illustrate devices according to an embodiment of the present disclosure.

Best Mode

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

For clarity of description, the present disclosure will be described in the context of a 3GPP communication system (e.g., LTE and NR), which should not be construed as limiting the spirit of the present disclosure. LTE refers to a technology beyond 3GPP TS 36.xxx Release 8. Specifically, the LTE technology beyond 3GPP TS 36.xxx Release 10 is called LTE-A, and the LTE technology beyond 3GPP TS 36.xxx Release 13 is called LTE-A pro. 3GPP NR is the technology beyond 3GPP TS 38.xxx Release 15. LTE/NR may be referred to as a 3GPP system. "xxx" specifies a technical specification number. LTE/NR may be generically referred to as a 3GPP system. For the background technology, terminologies, abbreviations, and so on as used herein, refer to technical specifications published before the present disclosure. For example, the following documents may be referred to.

3GPP LTE
36.211: Physical channels and modulation
36.212: Multiplexing and channel coding
36.213: Physical layer procedures
36.300: Overall description
36.331: Radio Resource Control (RRC)
3 GPP NR
38.211: Physical channels and modulation
38.212: Multiplexing and channel coding
38.213: Physical layer procedures for control
38.214: Physical layer procedures for data
38.300: NR and NG-RAN Overall Description
38.331: Radio Resource Control (RRC) protocol specification FIG. 1 illustrates a radio frame structure used for NR.

In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM(A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

Table 1 exemplarily illustrates that the number of symbols per slot, the number of slots per frame, and the number of slots per subframe vary according to SCSs in a normal CP case.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N^{slot}_{symb}$: number of symbols in a slot
*$N^{frame,u}_{slot}$: number of slots in a frame
*$N^{subframe,u}_{slot}$: number of slots in a subframe Table 2 illustrates that the number of symbols per slot, the number of slots per frame, and the number of slots per subframe vary according to SCSs in an extended CP case.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells.

FIG. 2 illustrates a resource grid during the duration of one slot.

A slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped.

FIG. 3 illustrates a structure of a self-contained slot.

In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

1. DL only configuration
2. UL only configuration

3. Mixed UL-DL configuration

DL region+Guard period (GP)+UL control region

DL control region+GP+UL region

DL region: (i) DL data region, (ii) DL control region+DL data region

UL region: (i) UL data region, (ii) UL data region+UL control region

The PDCCH may be transmitted in the DL control region, and the PDSCH may be transmitted in the DL data region. The PUCCH may be transmitted in the UL control region, and the PUSCH may be transmitted in the UL data region. The GP provides a time gap in the process of the UE switching from the transmission mode to the reception mode or from the reception mode to the transmission mode. Some symbols at the time of switching from DL to UL within a subframe may be configured as the GP.

In the present disclosure, a base station (BS) may be, for example, a gNode B (gNB).

FIG. 4 illustrates an ACK/NACK transmission process. Referring to FIG. 4, the UE may detect a PDCCH in slot #n. The PDCCH includes DL scheduling information (e.g., DCI format 1_0 or DCI format 1_1). The PDCCH indicates a DL assignment-to-PDSCH offset, K0 and a PDSCH-to-HARQ-ACK reporting offset, K1. For example, DCI format 1_0 or DCI format 1_1 may include the following information.

Frequency domain resource assignment: Indicates an RB set assigned to a PDSCH.

Time domain resource assignment: Indicates K0 and the starting position (e.g. OFDM symbol index) and length (e.g. the number of OFDM symbols) of the PDSCH in a slot.

PDSCH-to-HARQ_feedback timing indicator: Indicates K1.

After receiving a PDSCH in slot #(n+K0) according to the scheduling information of slot #n, the UE may transmit UCI on a PUCCH in slot #(n+K1). The UCI includes an HARQ-ACK response to the PDSCH. In the case where the PDSCH is configured to carry one TB at maximum, the HARQ-ACK response may be configured in one bit. In the case where the PDSCH is configured to carry up to two TBs, the HARQ-ACK response may be configured in two bits if spatial bundling is not configured and in one bit if spatial bundling is configured. When slot #(n+K1) is designated as an HARQ-ACK transmission timing for a plurality of PDSCHs, UCI transmitted in slot #(n+K1) includes HARQ-ACK responses to the plurality of PDSCHs.

FIG. 5 illustrates an exemplary PUSCH transmission process. Referring to FIG. 5, the UE may detect a PDCCH in slot #n. The PDCCH may include UL scheduling information (e.g., DCI format 0_0 or DCI format 0_1). DCI format 0_0 and DCI format 0_1 may include the following information.

Frequency domain resource assignment: Indicates an RB set allocated to a PUSCH.

Time domain resource assignment: Specifies a slot offset K2 indicating the starting position (e.g., symbol index) and length (e.g., the number of OFDM symbols) of the PUSCH in a slot. The starting symbol and length of the PUSCH may be indicated by a start and length indicator value (SLIV), or separately.

The UE may then transmit a PUSCH in slot #(n+K2) according to the scheduling information in slot #n. The PUSCH includes a UL-SCH TB.

FIG. 6 illustrates exemplary multiplexing of UCI in a PUSCH. If a plurality of PUCCH resources overlap with a PUSCH resource in a slot and a PUCCH-PUSCH simultaneous transmission is not configured in the slot, UCI may be transmitted on a PUSCH (UCI piggyback or PUSCH piggyback), as illustrated. In the illustrated case of FIG. 8, an HARQ-ACK and CSI are carried in a PUSCH resource.

1. Wireless Communication System Supporting Unlicensed Band

FIG. 7 illustrates an exemplary wireless communication system supporting an unlicensed band applicable to the present disclosure.

In the following description, a cell operating in a licensed band (L-band) is defined as an L-cell, and a carrier of the L-cell is defined as a (DL/UL) LCC. A cell operating in an unlicensed band (U-band) is defined as a U-cell, and a carrier of the U-cell is defined as a (DL/UL) UCC. The carrier/carrier-frequency of a cell may refer to the operating frequency (e.g., center frequency) of the cell. A cell/carrier (e.g., CC) is commonly called a cell.

When a UE and a BS transmit and receive signals in a carrier-aggregated LCC and UCC as illustrated in FIG. 7(a), the LCC may be configured as a primary CC (PCC) and the UCC may be configured as a secondary CC (SCC). As illustrated in FIG. 7(b), the UE and the BS may transmit and receive signals in one UCC or a plurality of carrier-aggregated UCCs. That is, the UE and the BS may transmit and receive signals only in UCC(s) without an LCC.

Unless otherwise specified), a signal transmission/reception operation in an unlicensed band described in the present disclosure may be performed based on all the above-described deployment scenarios.

Radio Frame Structure for Unlicensed Band

Recently, the 3GPP standardization group has proceeded to standardize a 5G wireless communication system named new RAT (NR). The 3GPP NR system has been designed to provide a plurality of logical networks in a single physical system and support services with various requirements (e.g., eMBB, mMTC, URLLC, etc.) by changing a transmission time interval (TTI) and/or an OFDM numerology (e.g., OFDM symbol duration, SCS, etc.). In recent years, data traffic has significantly increased with the advent of smart devices. Thus, the 3GPP NR system has also considered the use of an unlicensed band for cellular communication as in License-Assisted Access (LAA) of the legacy 3GPP LTE system. However, unlike the LAA, a NR cell in the unlicensed-band (NR U-cell) aims to support standalone operation. For example, PUCCH, PUSCH, and/or PRACH transmission may be supported in the NR UCell.

The NR frame structure of FIG. 1 may be used for an operation in an unlicensed band. The configuration of OFDM symbols occupied for UL/DL signal transmission in the frame structure for the unlicensed band may be configured by the BS. The term OFDM symbol may be replaced with SC-FDM(A) symbol.

In the following description, a plurality of CCs (CC indexes) may be replaced with a plurality of BWPs (BWP indexes) configured in one (or more) CC(s) or (serving) cell(s), or a plurality of CCs/cells each including a plurality of BWPs (i.e., CC (index)-BWP (index) combinations). In this situation, the proposed principle/operations of the present disclosure are also applicable in the same manner.

FIG. 8 illustrates an exemplary method of occupying resources in an unlicensed band. According to regional regulations for the U-band, a communication node in the U-band needs to determine whether a corresponding channel is used by other communication node(s) before transmitting a signal. Specifically, the communication node may perform carrier sensing (CS) before transmitting the signal so as to check whether the other communication node(s) perform signal transmission. When the other communication node(s)

perform no signal transmission, it is said that clear channel assessment (CCA) is confirmed. When a CCA threshold is predefined or configured by higher layer signaling (e.g., RRC signaling), if the detected channel energy is higher than the CCA threshold, the communication node may determine that the channel is busy. Otherwise, the communication node may determine that the channel is idle. When it is determined that the channel is idle, the communication node may start the signal transmission in the UCell. The Wi-Fi standard (802.11ac) specifies a CCA threshold of 62 dBm for non-Wi-Fi signals and a CCA threshold of −82 dBm for Wi-Fi signals. The sires of processes described above may be referred to as Listen-Before-Talk (LBT) or a channel access procedure (CAP). The LBT may be interchangeably used with the CAP or CCA.

Specifically, for DL reception/UL transmission in an unlicensed band, one or more of the following channel access procedure (CAP) methods may be used in a wireless communication system related to the present disclosure.

Method of Transmitting DL Signal in Unlicensed Band

To transmit a DL signal in an unlicensed band, the BS may indicate the configuration of OFDM symbols used in subframe #n to the UE by signaling. The term subframe may be replaced with slot or time unit (TU).

The BS may perform one of the following unlicensed band access procedures (e.g., CAPs) to transmit a DL signal in the unlicensed band.

(1) First DL CAP Method

FIG. 9 is a flowchart illustrating a DL CAP for DL signal transmission in an unlicensed band, performed by a BS.

For DL signal transmission (e.g., transmission of a DL signal such as a PDSCH/PDCCH/enhanced PDCCH (EPDCCH)), the BS may initiate a CAP (S1210). The BS may randomly select a backoff counter N within a contention window (CW) according to step 1. N is set to an initial value Ninit (S1220). Ninit is a random value selected from the values between 0 and $CW_p$. Subsequently, when the backoff counter value N is 0 according to step 4 (S1230; Y), the BS terminates the CAP (S1232). The BS may then perform a Tx burst transmission including transmission of a PDSCH/PDCCH/EPDCCH (S1234). On the contrary, when the backoff counter value N is not 0 (S1230; N), the BS decrements the backoff counter value by 1 according to step 2 (S1240). Subsequently, the BS checks whether the channel of U-cell(s) is idle (S1250). If the channel is idle (S1250; Y), the BS determines whether the backoff counter value is 0 (S1230). On the contrary, when the channel is not idle, that is, the channel is busy (S1250; N), the BS determines whether the channel is idle during a longer defer duration $T_d$ (25 usec or longer) than a slot duration (e.g., 9 usec) according to step 5 (S1260). If the channel is idle during the defer duration (S1270; Y), the BS may resume the CAP. The defer duration may include a 16-usec duration and the immediately following $m_p$ consecutive slot durations (e.g., each being 9 usec). On the contrary, if the channel is busy during the defer duration (S1270; N), the BS re-checks whether the channel of the U-cell(s) is idle during a new defer duration by performing step S1260 again.

Table 3 illustrates that mp, a minimum CW, a maximum CW, a maximum channel occupancy time (MCOT), and an allowed CW size applied to a CAP vary according to channel access priority classes.

TABLE 3

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

A CW size applied to the first DL CAP may be determined in various methods. For example, the CW size may be adjusted based on the probability of HARQ-ACK values corresponding to PDSCH transmission(s) within a predetermined time period (e.g., a reference TU) being determined as NACK. In the case where the BS performs a DL transmission including a PDSCH that is associated with a channel access priority class p on a carrier, if the probability z of HARQ-ACK values corresponding to PDSCH transmission(s) in reference subframe k (or reference slot k) being determined as NACK is at least 80%, the BS increases a CW value set for each priority class to the next higher allowed value. Alternatively, the BS maintains the CW value set for each priority class to be an initial value. A reference subframe (or reference slot) may be defined as the starting subframe (or slot) of the most recent transmission on the carrier made by the BS, for which at least some HARQ-ACK feedback is expected to be available.

(2) Second DL CAP Method

The BS may perform a DL signal transmission (e.g., a signal transmission including a discovery signal transmission, without a PDSCH) in an unlicensed band according to the second DL CAP method described below.

When the signal transmission duration of the BS is equal to or less than 1 ms, the BS may transmit a DL signal (e.g., a signal including a discovery signal without a PDSCH) in the unlicensed band immediately after sensing the channel to be idle for at least a sensing duration $T_{drs}$=25 us. $T_{drs}$ includes a duration $T_f$ (=16 us) following one sensing slot duration $T_{sl}$ (=9 us).

(3) Third DL CAP Method

The BS may perform the following CAPs for DL signal transmission on multiple carriers in an unlicensed band.

1) Type A: The BS performs a CAP for multiple carriers based on a counter N defined for each carrier (a counter N considered in a CAP) and performs a DL signal transmission based on the CAP.

Type A1: The counter N for each carrier is determined independently, and a DL signal is transmitted on each carrier based on the counter N for the carrier.

Type A2: The counter N of a carrier with a largest CW size is set for each carrier, and a DL signal is transmitted on each carrier based on the counter N for the carrier.

2) Type B: The BS performs a CAP based on a counter N only for a specific one of a plurality of carriers and performs a DL signal transmission by checking whether the channels of the other carriers are idle before a signal transmission on the specific carrier.

Type B1: A single CW size is defined for a plurality of carriers, and the BS uses the single CW size in a CAP based on the counter N for a specific carrier.

Type B2: A CW size is defined for each carrier, and the largest of the CW sizes is used in determining Ninit for a specific carrier.

Method of Transmitting UL Signal in Unlicensed Band

For a UL signal transmission in an unlicensed band, the BS may transmit information about a UL transmission period to the UE by signaling.

For a UL signal transmission in the unlicensed band, the UE performs a contention-based CAP. For example, the UE may perform a Type 1 CAP or a Type 2 CAP for UL signal transmission in the U-band. In general, the UE may perform a CAP configured/indicated by the BS (e.g., Type 1 CAP or Type 2 CAP) for the UL signal transmission.

(1) Type 1 UL CAP Method

FIG. 10 is a flowchart illustrating UE's Type 1 CAP operation for UL signal transmission.

To transmit a signal in the U-band, the UE may initiate a CAP (S1510). The UE may randomly select a backoff counter N within a contention window (CW) according to step 1. In this case, N is set to an initial value $N_{init}$ (S1520). $N_{init}$ may have a random value between 0 and $CW_p$. If it is determined according to step 4 that the backoff counter value (N) is 0 (YES in S1530), the UE terminates the CAP (S1532). Then, the UE may perform Tx burst transmission (S1534). If the backoff counter value is non-zero (NO in S1530), the UE decreases the backoff counter value by 1 according to step 2 (S1540). The UE checks whether the channel of U-cell(s) is idle (S1550). If the channel is idle (YES in S1550), the UE checks whether the backoff counter value is 0 (S1530). On the contrary, if the channel is not idle in S1550, that is, if the channel is busy (NO in S1550), the UE checks whether the corresponding channel is idle for a defer duration $T_d$ (longer than or equal to 25 usec), which is longer than a slot duration (e.g., 9 usec), according to step 5 (S1560). If the channel is idle for the defer duration (YES in S1570), the UE may resume the CAP. Here, the defer duration may include a duration of 16 usec and mp consecutive slot durations (e.g., 9 usec), which immediately follows the duration of 16 usec. If the channel is busy for the defer duration (NO in S1570), the UE performs step S1560 again to check whether the channel is idle for a new defer duration.

Table 4 shows that the values of $m_p$, a minimum CW, a maximum CW, a maximum channel occupancy time (MCOT), and allowed CW sizes, which are applied to the CAP, vary depending on channel access priority classes.

TABLE 4

| Channel Access Priority Class (p) | $m_p$ | $CW_{min,p}$ | $CW_{max,p}$ | $T_{ulmcot,p}$ | allowed $CW_p$ sizes |
|---|---|---|---|---|---|
| 1 | 2 | 3 | 7 | 2 ms | {3, 7} |
| 2 | 2 | 7 | 15 | 3 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

NOTE 1:
For p = 3, 4, $T_{mcot,p}$ = 10 ms if the higher layer parameter 'absenceOfAnyOther Technology-r14' indicates TRUE, otherwise, $T_{ulmcot,p}$ = 6 ms.

NOTE 2:
When $T_{ulmcot,p}$ = 6 ms it may be increased to 8 ms by inserting one or more gaps. The minimum duration of a gap shall be 100 μs. The maximum duration before including any such gap shall be 6 ms.

The size of a CW applied to the Type 1 UL CAP may be determined in various ways. For example, the CW size may be adjusted depending on whether the value of a new data indicator (NDI) for at least one HARQ process associated with HARQ_ID_ref, which is the HARQ process ID of a UL-SCH in a predetermined time period (e.g., a reference TU), is toggled. When the UE performs signal transmission using the Type 1 CAP associated with the channel access priority class p on a carrier, if the value of the NDI for the at least one HARQ process associated with HARQ_ID_ref is toggled, the UE may set $CW_p$ to $CW_{min, p}$ for every priority class p∈{1,2,3,4}. Otherwise, the UE may increase $CW_p$ for every priority class p∈{1,2,3,4}, to a next higher allowed value.

A reference subframe (or slot) $n_{ref}$ is determined as follows.

When the UE receives a UL grant in a subframe (or slot) $n_g$ and transmits a UL-SCH in subframes (or slots) $n_0$, $n_1$, ... $n_w$, starting from the subframe (or slot) $n_0$ without a gap (the subframe (or slot) $n_w$ is the most recent subframe (or slot) before a subframe (or slot) $n_g$–3 in which the UE has transmitted a UL-SCH based on a Type 1 CAP), the reference subframe (or slot) $n_{ref}$ is the subframe (or slot) $n_0$.

(2) Type 2 UL CAP Method

When the UE uses the Type 2 CAP to transmit a UL signal (including the PUSCH) in a U-band, the UE may transmit the UL signal (including the PUSCH) in the U-band immediately after sensing that the channel is idle at least for a sensing period $T_{short\_ul}$ of 25 us. $T_{short\_ul}$ includes a duration $T_f$ of 16 us immediately followed by one slot duration $T_{sl}$ of 9 us. $T_f$ includes an idle slot duration $T_{sl}$ at the start thereof.

PUCCH and PUSCH Transmission in Unlicensed Band

On the other hand, in order to support a standalone operation in an unlicensed band (U-band) when receiving DL data (e.g., PDSCH), it may be necessary for the UE to perform HARQ-ACK (hereinafter referred to as A/N) feedback based on PUCCH and/or PUSCH transmission in the U-band.

As an example, the BS may schedule PDSCH transmission of a specific UE through a Channel Occupancy Time (COT) section secured by execution of LBT (CCA) operation. In addition, the BS may instruct transmission of the A/N feedback for the corresponding PDSCH received from the corresponding UE through the COT section (or any gNB-initiated COT section started/occupied by DL transmission of the BS) in which PDSCH transmission is scheduled. This operation will hereinafter be referred to as intra-COT A/N transmission.

As another example, due to the UE processing time caused by decoding of the PDSCH signal and encoding of the HARQ-ACK signal corresponding to the PDSCH decoding, the A/N feedback for the PDSCH received through a specific COT section may be transmitted from the UE through another COT section (alternatively, the section not belonging to any gNB-initiated COT section started/occupied by DL transmission of the BS) subsequent to the corresponding COT section. This operation will hereinafter be referred to as inter-COT A/N transmission.

On the other hand, whereas one CC or BWP configured for the UE in the U-band situation can be configured as a wideband having a larger bandwidth (BW) than the legacy LTE, the bandwidth (BW) in which CCA based on an independent LBT operation is requested can be limited in such broadband CC/BWP configuration situation (based on a specific rule). Accordingly, a unit sub-band in which each LBT is performed will hereinafter be defined as LBT-SB. A plurality of LBT-SBs may be (continuously or discontinuously) included in one wideband CC/BWP.

As a result, a plurality of candidate OUCCH resources may be indicated/configured in time/frequency domains (through RRC and/or DCI) in consideration of LBT failure (causing the corresponding A/N PUCCH transmission drop) of the A/N PUCCH in the U-band situation. The UE may transmit the A/N PUCCH through a specific resource (one resource) succeeded in LBT from among the plurality of candidate PUCCH resources.

The plurality of candidate PUCCH resources (e.g., slot, symbol group, etc.) temporally TDM-processed in one A/N PUCCH transmission may be (continuously or discontinuously) indicated or configured. This operation may be referred to as candidate T-domain resources. As a result, the UE may attempt to sequentially perform LBT in a plurality of (time) resources, and may transmit the A/N PUCCH through a specific resource that was (initially) successful in CCA.

In addition, the plurality of PUCCH resources (e.g., LBT-SB, BWP, and CC) separated from each other in the frequency domain may be configured in one A/N PUCCH transmission, and these resources may be referred to as candidate F-domain resources. As a result, the UE may attempt to (simultaneously) perform LBT for the corresponding (frequency) resources, so that the UE can transmit A/N PUCCH through specific resources succeeding in CCA.

Meanwhile, during PUSCH transmission in the U-band situation, the plurality of candidate starting symbols may be indicated/configured (through RRC and/or DCI) in a situation where the number of ending symbols of one PUSCH is fixed to '1' in consideration of LBT failure (causing the corresponding PUSCH transmission drop) in a similar way to the legacy LTE LAA. The UE may attempt to sequentially perform LBT for the candidate starting symbols, may determine a specific symbol (initially) successful in CCA to be a starting symbol, and may then perform PUSCH transmission. The candidate starting symbol may also be referred to as a candidate PUSCH resource.

The following operations in which a PUCCH based on the plurality of candidate T-domain resources and a PUSCH based on the plurality of candidate starting symbols overlap each other in the time domain in the U-band situation will hereinafter be described in detail. In detail, when the PUCCH and the PUSCH overlap each other, various methods for operating the UE and/or the BS associated with multiplexing transmission between the PUCCH and the PUSCH can be proposed. The proposed methods are not limited to transmission (Tx) operations or procedures in a combination of PUCCH and PUSCH of the proposed structure, and can also be generalized and applied to transmission operations or procedures in the case where a first UL channel based on the candidate T-domain resources, a second UL channel based on the plurality of candidate starting symbols, and/or signals are combined. In addition, the following proposed method is not limited to the LBT-based U-band operation, and can also be similarly applied to the L-band (or U-band) not involving the LBT.

FIG. 11 is a flowchart illustrating an uplink (UL) transmission procedure according to one embodiment of the present disclosure. Referring to FIG. 11, the UE may perform the PUCCH transmission process in the U-band (S102). For example, the step S102 may include performing the LBT process in the plurality of PUCCH resources so as to transmit UCI (e.g., HARQ-ACK, CSI). If the UCI is HARQ-ACK, the step S102 may include receiving a DL grant PDCCH, and receiving a PDSCH corresponding to the HARQ-ACK based on the DL grant PDCCH. IN addition, the UE may perform the PUSCH transmission process in the U-band (S104). The step S104 may include allowing the UE to receive the UL grant PDCCH, and allowing the UE to sequentially perform the LBT process for the candidate starting symbols so as to transmit the PUSCH. In this case, the candidate PUCCH resource and the PUSCH may overlap each other as shown in FIG. 12. If the candidate PUCCH resource and the PUSCH overlap each other in the time domain (S106, yes), the UE may control the PUCCH and/or PUSCH transmission procedures according to proposals of the present disclosure (S108). In contrast, if the candidate PUCCH resource and PUSCH do not overlap each other in the time domain (S106, no), the UE may independently transmit the PUCCH and the PUSCH according to the LBT results (S110).

The configuration/transmission methods for use in the case where the candidate PUCCH resource and the PUSCH overlap each other are as follows.

(1) EMBODIMENT 1 (CASE 1)

FIG. 12(a) is a conceptual diagram illustrating some candidate T-domain resources from among the candidate T-domain resources configured in the PUCCH overlap with other candidate starting symbols from among the candidate starting symbols configured in the PUSCH in the time domain. The candidate T-domain resources overlapping the PUSCH may be referred to as overlapped PUCCH resources. The candidate starting symbol overlapping the PUCCH may be referred to as an overlapped PUSCH starting and/or an overlapped PUSCH starting symbol. The candidate T-domain resources not overlapping the PUSCH may be referred to as non-overlapped PUCCH resources. The candidate starting symbol not overlapping the PUCCH may be referred to as a non-overlapped PUSCH starting and/or a non-overlapped PUSCH starting symbol.

In the situation where the candidate T-domain resources overlap the candidate starting symbols, the following operations can be considered to be UE operations related to PUCCH/PUSCH multiplexing.

First, the UE may consider (or treat) some candidate resources to be invalid as the UE operation related to PUCCH/PUSCH multiplexing. For example, the UE may consider the overlapped PUCCH resources and/or the overlapped PUSCH starting symbol to be invalid candidate resources. For such invalid candidate resources, the UE may not perform the LBT operation required to transmit the PUCCH and/or the PUSCH. For example, the UE may skip, omit, or drop the LBT operation for invalid candidate resources. In addition, the UE may not transmit the PUCCH and/or PUSCH through invalid candidate resources. For example, the UE may consider the overlapped PUCCH resources to be candidate PUCCH resources, or may consider the overlapped PUSCH starting symbol to be invalid candidate PUSCH resources. The UE may transmit the PUCCH and/or the PUSCH through the remaining resources other than the invalid candidate resources. The remaining resources may include valid candidate PUCCH resources and/or valid candidate PUSCH starting symbols. The UE may perform the LBT operation for the remaining resources so as to transmit the PUCCH and/or the PUSCH.

In addition, as the UE operation related to PUCCH/PUSCH multiplexing, the channel-level multiplexing may be used. Specifically, the UE may attempt to sequentially perform the LBT operation for the candidate PUCCH resources and the candidate PUSCH resources, and may perform channel-level multiplexing transmission between PUSCH and PUCCH on the basis of the initial LBT success time point. For example, the channel-level multiplexing may be TDM-performed.

When the UE initially succeeds in LBT for non-overlapped PUCCH resources, the UE may transmit the PUCCH including the UCI through the non-overlapped PUCCH resources. The UE may attempt to sequentially perform the LBT operation for both of the overlapped PUSCH starting symbol and the non-overlapped PUSCH starting symbol, may determine the candidate starting symbol initially succeeding in LBT to be the starting symbol, and may then perform PUSCH transmission.

The operation for the case in which the UE initially succeeds in LBT for the overlapped PUCCH resources may be changed according to one case in which PUCCH transmission and PUSCH transmission are indicated on the same LBT-SB and the other case in which PUCCH transmission and PUSCH transmission are indicated on different LBT-SB.

When PUCCH transmission and PUSCH transmission are indicated on the same LBT-SB after the UE initially succeeds in the LBT operation for the overlapped PUCCH resources, the UE may transmit the PUCCH including UCI on the overlapped PUCCH resources. In addition, the UE can perform mapping of the PUSCH signal from the next symbol subsequent to the ending symbol belonging to the overlapped PUCCH resources without execution of the additional LBT operation required for PUSCH transmission (i.e., after omitting the LBT operation), and can transmit the mapped PUSCH signal. In other words, the UE may transmit the PUCCH including UCI until reaching the ending symbol of the overlapped PUCCH resources, may perform mapping of the PUSCH signal without forming a time gap from the subsequent symbol, and may transmit the mapped PUSCH signal. The time gap may include a separate time gap (hereinafter referred to as an LBT gap) required for the LBT operation.

When PUCCH transmission and PUSCH transmission are indicated on different LBT-SBs after the UE initially succeeds in the LBT operation for the overlapped PUCCH resources, the UE may transmit the PUCCH including UCI on the overlapped PUCCH resources. In addition, the UE may attempt to sequentially perform the LBT operation for the non-overlapped PUSCH starting symbol, may determine the candidate starting symbol initially succeeding in the initial LBT to be the starting symbol, and may perform PUSCH transmission. That is, the UE may not transmit the PUSCH at the overlapped PUSCH starting symbol. In addition, the UE may not perform the LBT operation required for PUSCH transmission at the overlapped PUSCH starting symbol. For example, the UE may skip, omit, or drop the LBT operation for the invalid resources.

If the UE fails to perform the LBT operation for both of the non-overlapped PUCCH resources and the overlapped PUCCH resources, the UE may drop transmission of the PUCCH including UCI, may attempt to sequentially perform the LBT operation for the non-overlapped PUSCH starting symbol (and/or the overlapped PUSCH starting symbol), may determine the candidate starting symbol initially succeeding in LBT to be the starting symbol, and may then perform PUSCH transmission.

In addition, as an example of the UE operation related to PUCCH/PUSCH multiplexing, the UCI can be piggybacked on the PUSCH. In the situation where PUCCH transmission is omitted, the UE may piggyback the UCI to be transmitted through PUCCH toward the PUSCH, and may then transmit the PUSCH including the UCI. Alternatively, the UE may (repeatedly) transmit the UCI through both of PUCCH and PUSCH based on the LBT result. For example, whereas the UE uses the channel-level multiplexing, the UE can transmit the UCI-piggybacked PUSCH instead of the PUSCH including only data.

As a detailed example, if the UE initially succeeds in LBT for the non-overlapped PUCCH resources, the UE may transmit the PUCCH including UCI on the non-overlapped PUCCH resources. In addition, the UE may attempt to sequentially perform the LBT operation for both of the overlapped PUSCH starting symbol and the non-overlapped PUSCH starting symbol, may determine the candidate starting symbol initially succeeding in LBT to be the starting symbol, and may then transmit the UCI-piggybacked PUSCH.

The operation for the case in which the UE initially succeeds in LBT for the overlapped PUCCH resources may be changed according to one case in which PUCCH transmission and PUSCH transmission are indicated on the same LBT-SB and the other case in which PUCCH transmission and PUSCH transmission are indicated on different LBT-SB.

When PUCCH transmission and PUSCH transmission are indicated on the same LBT-SB after the UE initially succeeds in the LBT operation for the overlapped PUCCH resources, the UE may transmit the PUCCH including UCI on the overlapped PUCCH resources. In addition, the UE can perform mapping of the UCI-piggybacked PUSCH signal from the next symbol subsequent to the ending symbol belonging to the overlapped PUCCH resources without execution of the additional LBT operation required for PUSCH transmission (i.e., after omitting the LBT operation), and can transmit the mapped PUSCH signal. In other words, the UE may transmit the PUCCH including UCI until reaching the ending symbol of the overlapped PUCCH resources, may perform mapping of the UCI-piggybacked PUSCH signal without forming a time gap from the subsequent symbol, and may transmit the mapped PUSCH signal. The time gap may include a separate time gap (hereinafter referred to as an LBT gap) required for the LBT operation.

When PUCCH transmission and PUSCH transmission are indicated on different LBT-SBs after the UE initially succeeds in the LBT operation for the overlapped PUCCH resources, the UE may transmit the PUCCH including UCI on the overlapped PUCCH resources. In addition, the UE may attempt to sequentially perform the LBT operation for the non-overlapped PUSCH starting symbol, may determine the candidate starting symbol initially succeeding in the initial LBT to be the starting symbol, and may perform PUSCH transmission. That is, the UE may not transmit the PUSCH at the overlapped PUSCH starting symbol. In addition, the UE may not perform the LBT operation required for PUSCH transmission at the overlapped PUSCH starting symbol. For example, the UE may skip, omit, or drop the LBT operation for the invalid resources.

If the UE fails to perform the LBT operation for both of the non-overlapped PUCCH resources and the overlapped PUCCH resources, the UE may drop transmission of the PUCCH including UCI, may attempt to sequentially perform the LBT operation for the non-overlapped PUSCH starting symbol (and/or the overlapped PUSCH starting symbol), may determine the candidate starting symbol initially succeeding in LBT to be the starting symbol, and may then perform PUSCH transmission.

(2) EMBODIMENT 2

FIG. 12(b) is a conceptual diagram illustrating some candidate T-domain resources from among the candidate T-domain resources configured in the PUCCH overlap with the ending symbol configured in the PUSCH in the time domain. The candidate T-domain resources overlapping the PUSCH may be referred to as overlapped PUCCH resources. The candidate T-domain resources not overlapping the PUSCH may be referred to as non-overlapped PUCCH resources.

In the situation where the candidate T-domain resources overlap the candidate starting symbols, the following operations can be considered to be UE operations related to PUCCH/PUSCH multiplexing.

First, the UE may consider (or treat) some candidate resources to be invalid as the UE operation related to PUCCH/PUSCH multiplexing. For example, the UE may consider the overlapped PUCCH resources and/or the PUSCH to be invalid candidate resources. For such invalid candidate resources, the UE may not perform the LBT operation required to transmit the PUCCH and/or the PUSCH. For example, the UE may skip, omit, or drop the LBT operation for invalid candidate resources. In addition, the UE may not transmit the PUCCH and/or PUSCH through invalid candidate resources. For example, the UE may consider the overlapped PUCCH resources to be candidate PUCCH resources, or may consider the PUSCH resources to be invalid candidate PUSCH resources. The UE may transmit the PUCCH and/or the PUSCH through the remaining resources other than the invalid candidate resources. The remaining resources may include valid candidate PUCCH resources and/or valid candidate PUSCH starting symbols. The UE may perform the LBT operation for the remaining resources so as to transmit the PUCCH and/or the PUSCH.

In addition, as the UE operation related to PUCCH/PUSCH multiplexing, the channel-level multiplexing may be used. Specifically, the UE may attempt to sequentially perform the LBT operation for the candidate PUCCH resources and the candidate PUSCH resources, and may perform channel-level multiplexing transmission between PUSCH and PUCCH on the basis of the initial LBT success time point. For example, the channel-level multiplexing may be TDM-performed.

The UE operation may be configured in different ways according to one case in which PUCCH transmission and PUSCH transmission are indicated on the same LBT-SB and the other case in which PUCCH transmission and PUSCH transmission are indicated on different LBT-SBs, or may operate irrespective of the LBT-SB in which PUCCH transmission and PUSCH transmission are indicated.

As an example of the above-mentioned case in which one case in which PUCCH transmission and PUSCH transmission are indicated on the same LBT-SB and the other case in which PUCCH transmission and PUSCH transmission are indicated on different LBT-SBs are differently configured, assuming that PUCCH transmission and PUSCH transmission are indicated on the same LBT-SB, the UE may perform puncturing or rate-matching for symbols that overlap the overlapped PUCCH resources in the time domain, so that the UE may transmit the PUSCH without mapping of signals. In addition, the UE may transmit the PUCCH including UCI through the overlapped PUCCH resources without using a separate LBT operation for the PUCCH (in the situation where the LBT operation is omitted). In other words, the UE may transmit the PUSCH within the range from the candidate starting symbol succeeding in LBT to the last symbol that does not overlap the overlapped PUCCH resources, and may transmit the PUCCH including UCI within the range from the starting symbol of the overlapped PUCCH resources to the last symbol without forming a time gap. The time gap may include a separate time gap (hereinafter referred to as an LBT gap) required for the LBT operation.

If PUCCH transmission and PUSCH transmission are indicated on different LBT-SBs, the UE may perform puncturing or rate-matching for symbols that overlap the LBT gap for both of the overlapped PUCCH resources and the candidate PUCCH resources, so that the UE may transmit the PUSCH without mapping of signals. In addition, the UE may attempt to sequentially perform the LBT operation for both of the overlapped PUCCH resources and the non-overlapped PUCCH resources, and may transmit the PUCCH including UCI through the candidate PUCCH resources succeeding in the initial LBT.

As an example of the operation in which the UE operates irrespective of the LBT-SB in which PUCCH transmission and PUSCH transmission are indicated, the UE may perform signal mapping until reaching the originally configured ending symbol for PUSCH, and may then transmit the PUSCH. In addition, for the non-overlapped PUCCH resources, the UE may attempt to sequentially perform the LBT operation, and may transmit the PUCCH including UCI through the candidate PUCCH resources succeeding in the initial LBT.

The UE operation may vary depending on which one of the PUSCH candidate starting symbols is used for the successful LBT. For example, in the situation where the UE succeeds in the LBT operation at some candidate starting symbols from among the candidate starting symbols and transmits the PUSCH, the UE can differently perform the operation of the first case in which PUCCH transmission and PUSCH transmission are indicated on the same LBT-SB and the operation of the second case in which PUCCH transmission and PUSCH transmission are indicated on different LBT-SBs. If the UE succeeds in LBT at the remaining candidate starting symbols from among the candidate starting symbols and then transmits the PUSCH, the UE may operate irrespective of the LBT-SB in which PUCCH transmission and PUSCH transmission are indicated. Some specific candidate starting symbols may be, for example, the initial candidate starting symbol and/or some candidate starting symbols including the initial candidate starting symbols. The remaining candidate starting symbols may be, for example, the last candidate starting symbol and/or some candidate starting symbols including the last candidate starting symbol.

In addition, as an example of the UE operation related to PUCCH/PUSCH multiplexing, the UCI can be piggybacked on the PUSCH. In the situation where PUCCH transmission is omitted, the UE may piggyback the UCI to be transmitted through PUCCH toward the PUSCH, and may then transmit the PUSCH including the UCI. Alternatively, the UE may (repeatedly) transmit the UCI through both of PUCCH and PUSCH based on the LBT result. For example, whereas the UE uses the channel-level multiplexing, the UE can transmit the UCI-piggybacked PUSCH instead of the PUSCH including only data.

As a specific example, the UE operation may be configured in different ways according to the case in which PUCCH transmission and PUSCH transmission are indicated on the same LBT-SB and the other case in which PUCCH transmission and PUSCH transmission are indicated on different LBT-SBs. Assuming that PUCCH transmission and PUSCH transmission are indicated on the same LBT-SB, the UE may perform puncturing or rate-matching for symbols that overlap the overlapped PUCCH resources in the time domain, so that the UE may transmit the UCI-piggybacked PUSCH without mapping of signals. In addition, the UE may transmit the PUCCH including UCI through the overlapped PUCCH resources without using a separate LBT operation for the PUCCH (in the situation where the LBT operation is omitted). In other words, the UE may transmit the UCI-piggybacked PUSCH within the range from the candidate starting symbol succeeding in LBT to the last symbol that does not overlap the overlapped PUCCH resources, and may transmit the PUCCH including UCI within the range from the starting symbol of the overlapped PUCCH resources to the last symbol without forming a time gap. The time gap may include a separate time gap (hereinafter referred to as an LBT gap) required for the LBT operation. If the UCI-piggybacked PUSCH transmission was successful, the UE may omit the operation of transmitting the PUCCH including UCI.

If PUCCH transmission and PUSCH transmission are indicated on different LBT-SBs, the UE may perform puncturing or rate-matching for symbols that overlap the LBT gap for both of the overlapped PUCCH resources and the candidate PUCCH resources, so that the UE may transmit the UCI-piggybacked PUSCH without mapping of signals. In addition, the UE may attempt to sequentially perform the LBT operation for both of the overlapped PUCCH resources and the non-overlapped PUCCH resources, and may transmit the PUCCH including UCI through the candidate PUCCH resources succeeding in the initial LBT. If the UCI-piggybacked PUSCH transmission was successful, the UE may omit the operation of transmitting the PUCCH including UCI.

As an additional detailed example of the operation in which the UE operates irrespective of the LBT-SB in which PUCCH transmission and PUSCH transmission are indicated, the UE may perform signal mapping until reaching the originally configured ending symbol for PUSCH, and may then transmit the UCI-piggybacked PUSCH. In addition, for the non-overlapped PUCCH resources, the UE may attempt to sequentially perform the LBT operation, and may transmit the PUCCH including UCI through the candidate PUCCH resources succeeding in the initial LBT. If the UCI-piggybacked PUSCH transmission was successful, the UE may omit the operation of transmitting the PUCCH including UCI.

(3) UNIFIED HANDLING RULE

A (unified) handling rule can be used in any UL signal/channel overlap situation related to Embodiments 1 and 2.

For example, the operation of piggybacking the UCI to PUSCH from among various operations disclosed in Embodiments 1 and 2 can be used with higher priority than the channel-level multiplexing operation and/or the operation of considering some candidate resources to be invalid.

As a condition for enabling the UCI to be piggybacked on PUSCH, if resources allocated for PUSCH transmission overlap a first candidate PUCCH resource acting as the earliest candidate PUCCH resources on the time domain (for example, as shown in FIG. 13(a)), and if a processing time calculated based on the first candidate PUCCH resource satisfies a minimum processing time of the UE, the UCI can be piggybacked on the PUSCH.

For example, the processing time may include a time that is consumed and/or required to piggyback the UCI on the PUSCH. In addition, the processing time may be determined in consideration of the UCI generation and/or coding time, the UL data processing and/or coding time, etc. In the communication system configured not to use the U-band, the processing time required for UCI generation and/or coding may be determined on a PUCCH transmission time point. Since the plurality of candidate PUCCH resources is configured in the U-band, information about which one of the candidate PUCCH resources will be used to determine a reference PUCCH transmission time point may be considered problematic. In the present disclosure, as the reference PUCCH transmission time point, a time point of the first candidate PUCCH resource from among the plurality of candidate PUCCH resources can be used. For example, assuming that the processing time calculated based on the first candidate PUCCH resource is denoted by 'A' and the minimum processing time of the UE is denoted by 'B', UCI can be piggybacked on PUSCH at the condition of A≥B, and UCI cannot be piggybacked on PUSCH due to lack of the UE processing capability at the condition of A<B.

The UE minimum processing time may be, for example, a minimum processing time required to prepare for PUCCH and/or PUSCH transmission, after the UE receives the PUCCH and/or the PUSCH. The processing time calculated based on the first candidate PUCCH resource may be, for example, a given processing time required to prepare for UCH transmission through the first candidate PUCCH resource, after the UE receives the PDCCH and/or PDSCH.

Although FIG. 13(a) illustrates that the first candidate PUCCH resource located earlier than PUSCH resources in the time domain, the content disclosed in FIG. 13(a) can also be equally applied to the case in which PUSCH resources are located earlier than the first candidate PUCCH resources in the time domain.

Alternatively, as a condition for enabling the UCI to be piggybacked on PUSCH, if resources allocated for PUSCH transmission overlap any one of the candidate PUCCH resources (for example, as shown in FIG. 13(b)), and if a processing time calculated based on the first candidate PUCCH resource indicating the earliest PUCCH resource on the time domain satisfies a minimum processing time of the UE, the UCI can be piggybacked on the PUSCH.

If the condition for enabling the UCI to be piggybacked on PUSCH is not satisfied, the operation in which the channel-level multiplexing operation and/or some candidate resources are considered invalid can be applied as shown in Embodiment 1 or 2.

In the embodiments of FIG. 13, the processing time calculated on PUSCH may be acquired on the assumption that the UE minimum processing time is satisfied.

In the present disclosure, the LBT-SB may be replaced with the BWP or the CC, and the resultant BWP or CC can be used or applied. As a result, the same/different LBT-SBs can be replaced with the same/different BWPs or the same/different CCs, and the resultant BWP or CC can be used or applied. For example, LBT-SB may refer to a frequency unit/band in which LBT is performed. If the frequency unit/band in which LBT is performed is set to CC (cell) or BWP, the term "LBT-SB" described in the present disclosure can be replaced with CC (cell) or BWP.

FIG. 14 is a flowchart illustrating a signal reception method according to embodiments of the present disclosure.

Referring to FIG. 14, the embodiments of the present disclosure can be performed by the UE. The method for enabling the UE to receive signals may include receiving DCI indicating UL data transmission (S1401), performing the LBT operation on a sub-band where PUSCH resources are located, and transmitting UL data on the PUSCH resources based on the LBT operation (S1405).

Specifically, in the situation where PUSCH resources overlap one or more candidate PUCCH resources from among the candidate PUCCH resources, and the processing time of the first candidate PUCCH resource (indicating the earliest PUCCH resource on the time domain) from among the candidate PUCCH resources is equal to or longer than the UE minimum processing time, UCI (Uplink Control Information) for the candidate PUCCH resources can be piggybacked on the PUSCH.

Preferably, the first candidate PUCCH resources may overlap the PUSCH resources.

In addition, the PUSCH resources may include the plurality of candidate starting symbols.

In the situation where PUSCH resources overlap one or more candidate PUCCH resources from among the candidate PUCCH resources, and the processing time of the first candidate PUCCH resource (indicating the earliest PUCCH resource on the time domain) from among the candidate PUCCH resources is less than the UE minimum processing time, UCI may not be piggybacked on the PUSCH resources. In the situation in which UCI is not piggybacked on the PUSCH resources, the candidate PUCCH resources and/or some of the candidate starting symbols of PUSCH resources may be considered invalid. Since the UCI is not piggybacked on PUSCH resources, the channel-level multiplexing can be used for the candidate PUCCH resources and PUSCH resources.

For example, based on the fact that UCI is not piggybacked on PUSCH resources, UCI can be transmitted through the remaining resources other than at least one candidate PUCCH resource from among the candidate PUCCH resources. Alternatively, PUSCH can be transmitted through the remaining resources other than at least one candidate starting symbol overlapping at least one candidate PUCCH resource from among the plurality of candidate starting symbols.

Based on the fact that the candidate PUCCH resources and the PUSCH resources are located at the same sub-band, the LBT operation for subsequent resources on the time domain from among the PUSCH resources and the candidate PUCCH resources can be omitted as necessary.

In addition to the operations of FIG. 14, one or more operation from among the operations described in FIGS. 1 to 13 may be combined and further performed as needed.

Example of Communication System to which the Present Disclosure is Applied

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

FIG. 15 illustrates a communication system 1 applied to the present disclosure.

Referring to FIG. 15, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smart pad, a wearable device (e.g., a smart watch or smart glasses), and a computer (e.g., a laptop). The home appliance may include a TV, a refrigerator, a washing machine, and so on. The IoT device may include a sensor, a smart meter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Example of Wireless Device to which the Present Disclosure is Applied

FIG. 16 illustrates wireless devices applicable to the present disclosure.

Referring to FIG. 16, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 15.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Example of Use of Wireless Device to which the Present Disclosure is Applied

FIG. 17 illustrates another example of a wireless device applied to the present disclosure. The wireless device may be implemented in various forms according to a use case/service (refer to FIG. 15).

Referring to FIG. 17, wireless devices 100 and 200 may correspond to the wireless devices 100 and 200 of FIG. 16 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 16. For example, the transceiver(s) 114 may include the one or more transceivers 106 and 206 and/or the one or more antennas 108 and 208 of FIG. 16. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100a of FIG. 15), the vehicles (100b-1 and 100b-2 of FIG. 15), the XR device (100c of FIG. 15), the hand-held device (100d of FIG. 15), the home appliance (100e of FIG. 15), the IoT device (100f of FIG. 15), a digital broadcasting terminal, a hologram device, a public safety device, an MTC device, a medical device, a FinTech device (or a finance device), a security device, a climate/environment device, the AI server/device (400 of FIG. 15), the BSs (200 of FIG. 15), a network node, or the like. The wireless device may be mobile or fixed according to a use case/service.

In FIG. 17, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

Example of Vehicle or Autonomous Driving Vehicle to which the Present Disclosure is Applied FIG. 18 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 18, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 18, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on.

The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

As described above, the present disclosure is applicable to various wireless communication systems.

The invention claimed is:

1. A method for a user equipment (UE) to transmit and receive signals in a wireless communication system comprising:
receiving downlink control information (DCI) for uplink (UL) data;
performing a listen-before-talk (LBT) operation on a sub-band including a physical uplink shared channel (PUSCH) resource; and
transmitting the uplink (UL) data through a PUSCH on the PUSCH resources based on the LBT operation,
wherein, based on the PUSCH resource being overlapped with at least one candidate physical uplink control channel (PUCCH) resource among candidate PUCCH resources and based on a processing time of an earliest candidate PUCCH resource in a time domain among the candidate PUCCH resources being equal to or longer than a minimum processing time for preparation of the PUSCH including the UL data and uplink control information (UCI), the UCI for the candidate PUCCH resources is piggybacked on the PUSCH resource,
wherein the earliest candidate PUCCH resource is one of remaining candidate PUCCH resources not overlapped with the PUSCH resource among the candidate PUCCH resources.

2. The method according to claim 1, wherein:
based on the PUSCH resource being overlapped with the at least one candidate PUCCH resource and based on the processing time being less than the minimum processing time, the UCI is not piggybacked on the PUSCH resource.

3. The method according to claim 2, wherein:
based on the UCI being not piggybacked on the PUSCH resource, the UCI is transmitted through one of the remaining candidate PUCCH resources.

4. The method according to claim 3, wherein:
based on the candidate PUCCH resources and the PUSCH resources being included in the sub-band, a listen-before-talk (LBT) operation for a subsequent resources on the time domain among the PUSCH resources and the candidate PUCCH resources is omitted.

5. A user equipment (UE) configured to transmit and receive signals in a wireless communication system comprising:
at least one transceiver;
at least one processor; and
at least one memory operatively connected to the at least one processor, and configured to store instructions such that the at least one processor performs specific operations by executing the instructions,
wherein the specific operations include:
receiving downlink control information (DCI) for uplink (UL) data;
performing a listen-before-talk (LBT) operation on a sub-band including a physical uplink shared channel (PUSCH) resource; and
transmitting the uplink (UL) data through a PUSCH on the PUSCH resource based on the LBT operation,
wherein, based on the PUSCH resource being overlapped with at least one candidate physical uplink control channel (PUCCH) resource among candidate PUCCH resources and based on a processing time of an earliest candidate PUCCH resource in a time domain among the candidate PUCCH resources being equal to or longer than a minimum processing time for preparation of the PUSCH including the UL data and uplink control information (UCI), the UCI for the candidate PUCCH resources is piggybacked on the PUSCH resource,
wherein the earliest candidate PUCCH resource is one of remaining candidate PUCCH resources not overlapped with the PUSCH resource among the candidate PUCCH resources.

6. The user equipment (UE) according to claim 5, wherein:
based on the PUSCH resource being overlapped with the at least one candidate PUCCH resource and based on the processing time being less than the minimum processing time, the UCI is not piggybacked on the PUSCH resource.

7. The user equipment (UE) according to claim 6, wherein:
based on the UCI being not piggybacked on the PUSCH resource, the UCI is transmitted through one of the remaining candidate PUCCH resources.

8. The user equipment (UE) according to claim 7, wherein:
based on the candidate PUCCH resources and the PUSCH resources being included in the sub-band, a listen-before-talk (LBT) operation for a subsequent resource on the time domain among the PUSCH resources and the candidate PUCCH resources is omitted.

9. A device configured to operate for a user equipment (UE) comprising: at least one processor; and
at least one memory operatively connected to the at least one processor, and configured to store instructions such that the at least one processor performs specific operations by executing the instructions,
wherein the specific operations include:
receiving downlink control information (DCI) for uplink (UL) data;
performing a listen-before-talk (LBT) operation on a sub-band including a physical uplink shared channel (PUSCH) resource; and
transmitting the uplink (UL) data through a PUSCH on the PUSCH resources based on the LBT operation,
wherein, the PUSCH resource being overlapped with at least one candidate physical uplink control channel (PUCCH) resource among candidate PUCCH resources and based on a processing time of an earliest candidate PUCCH resource in a time domain among the candidate PUCCH resources being equal to or longer than a minimum processing time for preparation of the PUSCH including the UL data and uplink control information (UCI), the UCI for the candidate PUCCH resources is piggybacked on the PUSCH resource,
wherein the earliest candidate PUCCH resource is one of remaining candidate PUCCH resources not overlapped with the PUSCH resource among the candidate PUCCH resources.

10. The device according to claim 9, wherein:
based on the PUSCH resource being overlapped with the at least one candidate PUCCH resource and based on the processing time being less than the minimum processing time, the UCI is not piggybacked on the PUSCH resource.

11. The device according to claim 10, wherein:
based on the UCI being not piggybacked on the PUSCH resources, the UCI is transmitted through one of the remaining candidate PUCCH resources.

12. The device according to claim 11, wherein:
based on the candidate PUCCH resources and the PUSCH resources being included in the sub-band, a listen-before-talk (LBT) operation for a subsequent resources on the time domain among the PUSCH resources and the candidate PUCCH resources is omitted.

\* \* \* \* \*